United States Patent
Strassner

(10) Patent No.: US 9,460,417 B2
(45) Date of Patent: Oct. 4, 2016

(54) USING DYNAMIC OBJECT MODELING AND BUSINESS RULES TO DYNAMICALLY SPECIFY AND MODIFY BEHAVIOR

(71) Applicant: Futurewei Technologies, Inc., Dallas, TX (US)

(72) Inventor: John Strassner, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 622 days.

(21) Appl. No.: 13/916,993

(22) Filed: Jun. 13, 2013

(65) Prior Publication Data

US 2014/0279808 A1    Sep. 18, 2014

Related U.S. Application Data

(60) Provisional application No. 61/798,401, filed on Mar. 15, 2013.

(51) Int. Cl.
*G06F 15/177* (2006.01)
*G06Q 10/10* (2012.01)
*G06Q 10/06* (2012.01)

(52) U.S. Cl.
CPC .............. *G06Q 10/10* (2013.01); *G06Q 10/06* (2013.01)

(58) Field of Classification Search
CPC ..................................................... G06Q 10/10
USPC ........................................ 709/221, 225–226
See application file for complete search history.

(56) References Cited

U.S. PATENT DOCUMENTS

| | | | | |
|---|---|---|---|---|
| 5,727,158 A * | 3/1998 | Bouziane | .......... | G06F 17/30569 707/E17.006 |
| 7,434,109 B1 * | 10/2008 | Stabile | .................... | H04L 43/04 709/223 |
| 7,865,617 B1 * | 1/2011 | Pulleyn | ............. | H04L 29/12047 709/225 |
| 2004/0230681 A1 * | 11/2004 | Strassner | ............... | G06Q 10/10 709/226 |
| 2005/0021723 A1 * | 1/2005 | Saperia | ................. | H04L 41/022 709/223 |
| 2008/0071714 A1 * | 3/2008 | Menich | .................. | G06N 5/041 706/45 |

* cited by examiner

*Primary Examiner* — Duyen Doan
(74) *Attorney, Agent, or Firm* — Schwegman Lundberg & Woessner, P.A.

(57) ABSTRACT

A system and a method are provided for using dynamic object modeling and one or more types of policy rules to dynamically specify and modify system behavior at various levels of abstraction, including business, system, and device implementation. The system and method allow for specifying, instantiating, managing, and removing sets of temporary or permanent additions and/or modifications to the attributes or behavior of a set of objects, relationships, scripts, and/or applications of a device, module, subsystem, or system, without having to change the underlying code of these objects, relationships, scripts, and/or applications. The systems and methods enable attributes, methods and/or relationships (e.g., associations, aggregations, and/or compositions), as well as constraints on any of these elements, to be dynamically added or changed at runtime without changing any underlying code of the components being managed by instantiating and manipulating object instances in accordance with certain policy rules.

20 Claims, 17 Drawing Sheets

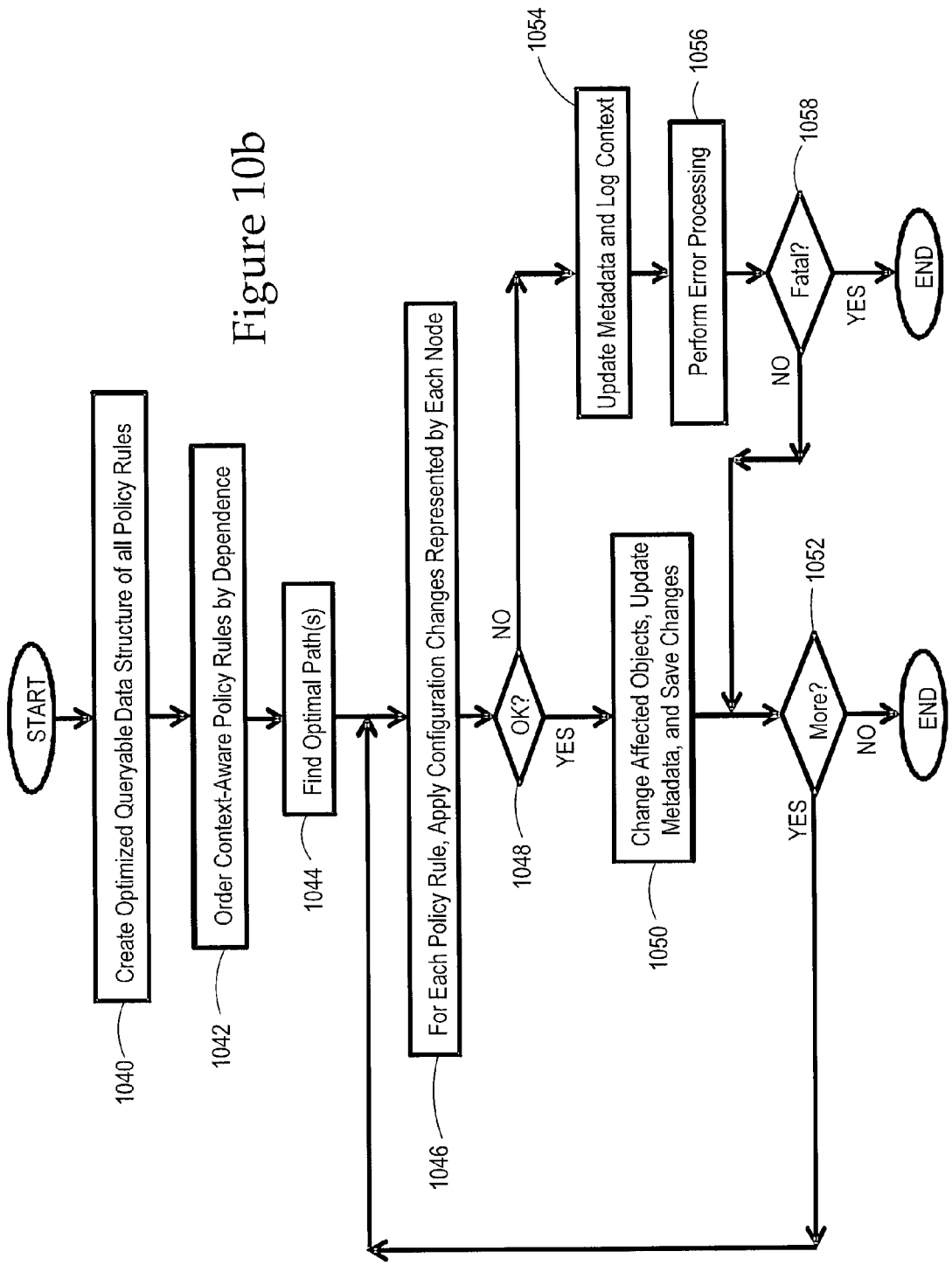

USING DYNAMIC OBJECT MODELING AND BUSINESS RULES TO DYNAMICALLY SPECIFY AND MODIFY BEHAVIOR

CROSS-REFERENCE TO RELATED APPLICATIONS

The present application claims the priority benefit of U.S. Provisional Patent Application Ser. No. 61/798,401, filed on Mar. 15, 2013, which is herein incorporated by reference. The present application is further related to the following commonly-owned U.S. patent applications:
   Ser. No. 11/422,681, entitled Autonomic Computing Method and Apparatus, filed Jun. 7, 2006, now issued as U.S. Pat. No. 7,542,956;
   Ser. No. 10/662,038, entitled System and Method for Mapping Between and Controlling Different Device Abstractions, filed Sep. 12, 2003, now issued as U.S. Pat. No. 7,558,847;
   Ser. No. 12/476,866, entitled Managing a Computer Network, filed Jun. 2, 2009, now issued as U.S. Pat. No. 8,010,650; and
   Ser. No. 12/124,560, entitled Autonomous Operation of Networking Devices, filed May 21, 2008, now issued as U.S. Pat. No. 8,019,838
all of which are herein incorporated by reference.

FIELD OF INVENTION

The present invention also relates to using dynamic object modeling and business policy rules (hereinafter referred to as business or policy rules) to dynamically specify and modify behavior of system resources, architecture, hardware, and/or data objects, at runtime without changing any code. Without limitation, the present invention relates to systems and methods for specifying, instantiating, managing, and/or removing sets of temporary or permanent additions and/or modifications to the attributes or behavior of a set of objects, architecture, hardware, relationships, scripts, and/or applications of a module, subsystem, or system, without having to change any underlying code of these objects, architecture, hardware, relationships, scripts, and/or applications.

BACKGROUND OF THE INVENTION

Network management in particular, as well as other forms of distributed management systems (e.g., storage management, server management, cloud centers, data centers), requires a high degree of flexibility. This is due to the fact that distributed network management requires interaction with many types of users typically having different levels of access to system resources, devices having unique configurations and divergent command syntaxes, as well as processing a multitude of events or triggers that may occur within the system. Current system architectures use a static approach that may account for some of the unique events, but are generally incapable of dynamically responding to new or unforeseen events that were not explicitly accounted for in advance.

For example, networking architectures and network devices, such as routers and switches, as well as their configurations, are becoming increasingly complex both in structure and functionality. Such complexities require network engineers or other personnel to know hundreds or thousands of vendor-specific commands or syntaxes and to master both the hardware and software idiosyncrasies of each differently manufactured networked device in order to successfully configure and manage a network. But traditional network management techniques, which include network device configuration and maintenance processes, fail to amply provide network administrators (or any network user) with a means to control the creation, the deployment, or the modification of each device configuration in a scalable and consistent manner.

Rather, network operators often configure devices without regard to any of the business processes affected by implemented configurations, which can lead to a disruption of network services. Without any mechanism for tying business processes and network management processes together, a newly applied configuration to a device just becomes a mere setting on a device. Consequently, the entire functionality of the configured device is not performed with business considerations prior to or after this configuration, which in turn, isolates the network processes from an organization's business processes and hinders efficiency.

Additionally, internal and external distributed system networks are becoming more sophisticated. There is a need in current systems to process and account for a host of unique system events and/or requests which may, for example, require handling of unique access authorizations or contextual data in order to properly process. The combined increase in network users and in sophistication of networked applications creates further need to integrate network management and business processes by establishing business rules that govern the usage of shared network resources.

To normalize the structure and functionality of each network resource requires at least abstracting the resource's functionality. But abstracting resource functionality presents a problem for most networks because they are built using distinct devices, each of which have many different capabilities and command syntaxes. Further, different vendors use different programming models for their vendor-specific network devices. The use of different programming models often leads to an inoperable or suboptimal networking of resources. For example, the use of varied programming models tends to impair a network operator's ability to determine whether a certain traffic conditioning used to separate different classes of traffic is correct.

FIG. 1 is a diagram showing network resources as sources of network information, each of which is associated with a different programming model. For example, a network portion 100 includes a first router manufactured by vendor one having a set of vendor-specific command line interface ("CLI") commands 102, a second router built by vendor two having another set of vendor-specific CLI commands 104, and one or more repositories of one or more Policy Information Bases ("PIBs") and/or Management Information Bases ("MIBs") 106. If FIG. 1 represents a portion of a conventional network, some routers support CLI 102 and 104 for provisioning while other routers employ Simple Network Management Protocol ("SNMP") for monitoring, which includes information from MIBs and PIBs 106.

Without an underlying uniform data representation 110 that relates the CLI commands to SNMP commands, it is in general impossible to correlate the commands of one programming model to the commands of another programming model. Since many network vendors build separate applications for managing different sets of features present in the same vendor-specific device, a number of multiple applications are required to manage and to provision devices from not only different devices from different vendors, but also from the same vendor as well.

Moreover, present devices are difficult to extend to accommodate new technologies, device versions, vendor-specific information, and other factors. Prior U.S. Pat. No. 8,010,650, having common inventorship hereto, and which is herein incorporated by reference, describes in detail the process of providing a system and a method for managing networks including one or more different devices having different command syntaxes, different programming models, and/or different functionalities. Systems and methods as disclosed therein are capable of providing an information source that allows management of different devices within a network system, but are generally difficult to extend to management of devices, events, and triggers of diverse distributed systems. For example, the disclosed networking systems are capable of recognizing and configuring a set of new devices as they connect to the network but are not sufficient to process a wide variety of system events and triggers outside of this context. Thus, such systems and methods may be used to implement certain features, namely the provision of an information model, in accordance with disclosed embodiments, but further capabilities and extension are required to dynamically respond to and handle system events at runtime as disclosed herein.

Although present devices and techniques for managing networks are functional, they are not sufficiently accurate or otherwise satisfactory. Moreover, devices and techniques are incapable of adequately recognizing and handling system events in order to provide administration of network functions and configuration in a dynamic runtime environment. Accordingly, a system and method are needed to address the shortfalls of present technology and to provide other new and innovative features.

SUMMARY OF THE INVENTION

Exemplary embodiments are shown in the drawings and are summarized below. These and other embodiments are more fully described in the Detailed Description section. It is to be understood, however, that there is no intention to limit the scope of the claims to the embodiments. One skilled in the art can recognize that there are numerous modifications, equivalents, and alternative constructions that fall within the spirit and scope the claims.

In one aspect, a method for specifying the features and behavior of a set system resources includes providing a management device having a processor and a memory. An information model is provided. The model includes a first set of model elements representing the features and behavior of a set of system resources. The management device derives a mapped data model from the information model, the mapped data model comprising a mapping of one or more elements of the first set of model elements into a second set of model elements of the mapped data model. The mapped data model is stored in a first repository. The management device derives one or more data objects from the mapped data model that are associated with a behavior of a system resource. The management device stores the data objects in a repository. The management device then causes one or more processes to be executed that effect a change in the system resource as specified by the one or more data objects.

In a second aspect, a method of configuring a manageable entity includes providing an information model stored in a first repository. The information model defines a set of relationships. A management device is provided having a processor and a memory. The management device is in communication with said first repository and is configured to respond to a system event. A second repository is provided for storing a plurality of code sections for deriving a set of data models from the information model. Each data model in the set of data models comprises a subset of the set of object relationships defined by information model. The managing device is further configured to respond to the system event by recognizing the system event, processing the system event to determine one or more requested configurations for a manageable entity; retrieving a plurality of code sections from the one or more data models for managing a requested configuration of said manageable entity; constructing one or more objects that represent the requested configuration for the manageable entity; and executing one or more processes that implement the requested configurations specified by the one or more objects.

In yet another aspect, a configurable network for specifying the features and behavior of a set of network resources includes at least one processor coupled to a memory. The memory stores an object-oriented information model. At least one transformation process that can convert all or part of the information model into all or part of at least one data model is provided. The processor modifies instance data of all or part of at least one object created in the object oriented data model based on received network events; invokes a mapping function to interpret the modified instance data, by mapping the modified instance data to one or more predefined control points in the codes of the one or more data models according to a policy rule; and executes the codes of the one or more data models to output network functions to configure a network resource according to the modified instance data. Preferably, the system need not change any of the underlying code of the more data models changes during the configuration.

Accordingly, various embodiments are provided that define a combination of an information model, a set of one or more data models, a set of patterns, a set of rules of different types, a set of control points, a set of mappings between rules and control points, a set of policy rules, and/or a set of metadata that dynamically define, create, manage, and remove behavior at runtime without changing code

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIG. 10b is an exemplary flow diagram of operations directed by the management device in responding to an event and/or trigger in accordance with certain embodiments.

DETAILED DESCRIPTION OF THE PREFERRED EMBODIMENTS

Figure 1:
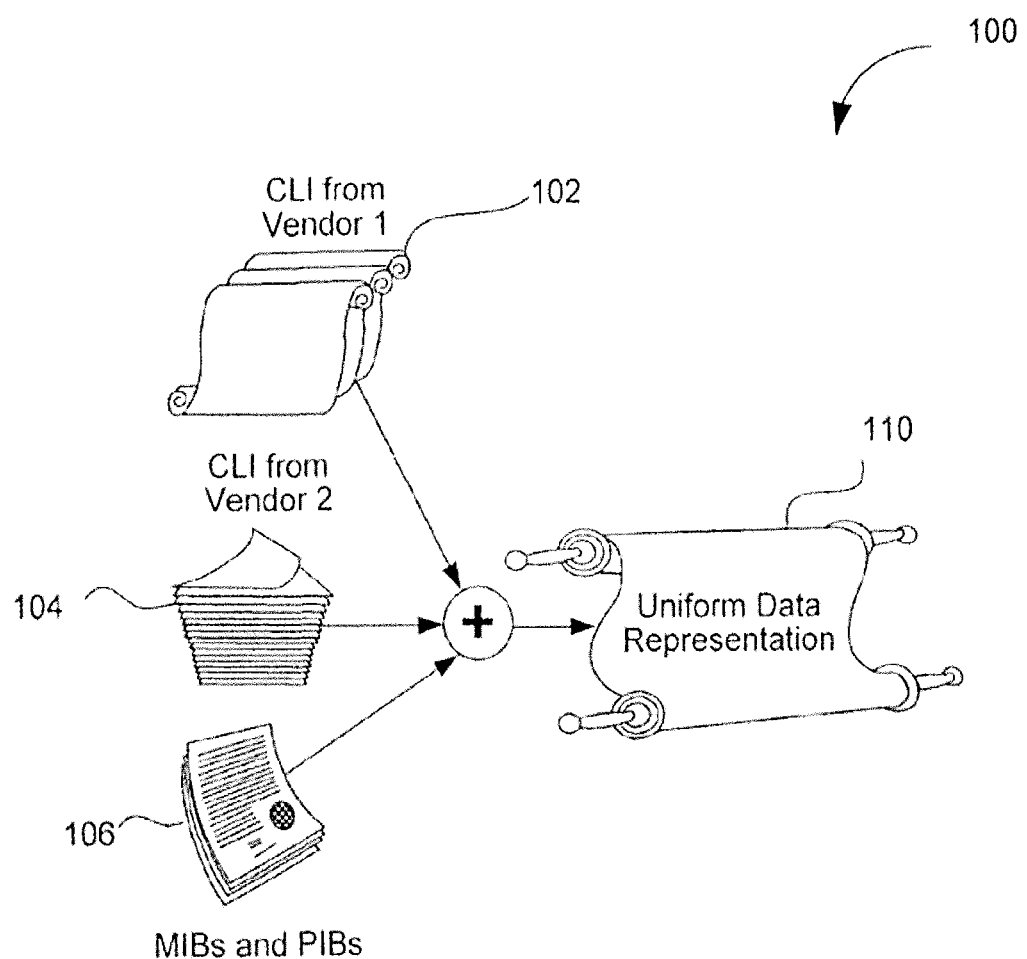
FIG. 1 is an exemplary block diagram showing network resources as sources of network information.

The present invention provides a system and a method for using dynamic object modeling and business and/or policy rules to dynamically specify and modify system behavior at various levels of abstraction, including business, system, and device implementation. More specifically, the present invention provides a system and method for specifying, instantiating, managing, and removing sets of temporary or permanent additions and/or modifications to the attributes or behavior of a set of objects, relationships, scripts, and/or applications of a device, module, subsystem, or system, without having to change the underlying code of these objects, relationships, scripts, and/or applications. An advantage of the disclosed system is that the means by which the additions and/or modifications to the attributes and/or behavior are implemented is defined using a dynamic object-oriented information model. It is further realized using a set of mappings to a set of dynamic object-oriented data models. Specifically, the system enables attributes, methods and/or relationships (e.g., associations, aggregations, and/or compositions), as well as constraints on any of these elements, to be dynamically added or changed at runtime without changing any underlying code of the components being managed by instantiating and manipulating object instances in accordance with certain policy rules.

The way by which the additions or modifications to the attributes and/or behavior mentioned above is executed is defined using a dynamic object-oriented information model. It is further realized using a set of mappings to a set of dynamic object-oriented data models. In certain embodiments, the means is further enhanced by using a set of policy rules that interact with the dynamic object-oriented information model, and hence, the set of dynamic object-oriented data models produced from the dynamic object-oriented information model, using pre-defined control points. The set of policy rules enable additional behavior to be performed before and/or after an object is instantiated and invoked via the pre-defined control points. In these embodiments, means may be further enhanced by using object wrapping, also referred herein as object stitching, to map sets of the dynamic object-oriented data models onto object instances via association and/or aggregations and/or compositions in order to further add behavior and/or modify system configurations at runtime without the need to change any underlying code. In such enhancements, use of policy rules and metadata may control which objects are stitched together, as well as how and when the stitching is done.

An exemplary system and method enables different system elements to share and exchange data for provisioning and managing those system elements and/or their configuration. Among other things, the embodiments facilitate the sharing and exchanging of data by using a normalized representation of system resources—including objects, system operating parameters, devices, architecture, hardware, or other system elements—to, for example, map object-oriented data models onto object instances associated with a system resource in order to add and/or change system elements, parameters, or configurations at runtime. The mapping feature utilized by the various embodiments may be applied equally among roles representing people, organizations, devices, services, metadata, or other system objects (e.g., network devices, servers, protocols, user requests, and events). For example, in the context of a network system, the embodiments may facilitate the mapping of hardware and/or software features associated with a system resource to other hardware and/or software features of other, distinct system resources. The normalized representations further allows similar functions in different system resources to be equated regardless of having dissimilar hardware and/or software features, such as dissimilar command structures and implementations. The mappings of distinct resource features further facilitate dynamically responding to system events triggered by heterogeneous resources, as well as to contextual data in requests initiated by the distinct resources. In such contexts, system resources generally include any network device, application, person, role, or any other element associated with a particular network and/or system.

According to at least one embodiment, an information model is provided for representing different system events, triggers, and/or devices, including different programming models, attributes, methods, relationships, and/or different device functionalities, as a common representation or abstraction. In particular, in one embodiment, various system triggers and/or events may similarly be normalized for representing and optimizing the system configuration. By representing aspects of the system configuration in a normalized model, the system can dynamically respond to unique system triggers and/or events by mapping sets of dynamic object-oriented data models onto object instances via association, aggregations, and/or compositions (i.e. object-wrapping) in order to add and/or change system configurations at runtime without the need to change any underlying code.

In another embodiment, various user or device requests may be normalized and represented in a uniform model that allows a system to dynamically respond to the user or device request, for example, by reading metadata embedded within the request, and adjusting the system elements and/or configuration in accordance with data stored within the information model.

In another embodiment different hardware features of a network device may be normalized for representing the physical, hardware, or software composition of dissimilar devices in a common way, such as by a data model, which enables mapping of equivalent physical, hardware, or software capabilities of different devices. Further, by representing one or more physical, hardware, or software characteristics of a device as, for example, an extensible representation of the physical characteristics (e.g., represented in XML), the associated logical functions of that device can also be related to logical functions of other different devices.

One skilled in the art would recognize that such functionality between the embodiments is not mutually exclusive and/or jointly exhaustive. The normalized representations contained in various embodiments of the current invention may be further extended in accordance with the present invention to account for a host of system events and/or triggers. Moreover, the type of object (or set of objects) whose behavior can be dynamically changed at runtime is limited only by the inherent ability of the management device to store and define behavior relating to parameter(s) of the affected object and/or device, a set of objects and/or devices, relationships between objects and/or devices, constraints on any of the preceding behaviors, interactions between a set of objects and/or devices, and the rest of the system. For example, the instant invention may be applied equally to roles representing people, organizations, devices, or other objects as well as to resources (e.g., devices, servers, protocols, and events), services, policy rules, and metadata. As used in the preferred embodiment, policy rules may guide a system's response to events or triggers in a variety of forms and account for a host of states to which the system may dynamically respond in order to optimize system configuration and/or event processing.

As described herein, an "information model" can refer to entities in a managed environment ("managed entities"), the majority of which may be related to each other (e.g., they may constitute a network), the interrelationships, features, and behaviors of such managed entities, and/or how data flows within the network in a manner that is independent of how the data is stored and retrieved in a repository. An information model therefore can include abstractions and can represent the various entities in a managed environment, as well as parameters of system operations or constraints. Further, the information model can be used as a "dictionary" that defines different characteristics of managed entities and how those characteristics relate to each other. For example, an information model can be used to specify a data structure for organizing physical and logical information for describing the physical and logical characteristics of managed entities. This data structure can also be used to describe how other managed entities use system parameters and are related to specific physical and logical managed assets. By using an exemplary information model in the manner of the present invention, different networking products and applications can share and reuse information with which managed entities relate.

A preferred embodiment of this invention uses a single information model, which serves as a single master dictionary of information. However, it is contemplated that various embodiments could use multiple information models. Such embodiments may maintain integrity by providing a management device that takes all knowledge from each information model into account in order to derive any necessary mapping that is required from an information model to a data model and vice-versa.

A "data model" can refer to any concrete representation of the information model that defines how data is stored, manipulated and/or retrieved using a specific type of repository and access protocol. A data model, which can include data structures, operations, rules, and the like, is analogous to the implementation of the data defined in an information model, but using a specific platform and a particular repository. The platform and repository may further put specific constraints on languages and protocols that can be used. If such constraints are made, then a data model may also take such constraints into account "Mapping," as described herein can refer to model mapping, which is a translation from one type of model (e.g., information model) to another type of model (e.g. data model). Model mapping changes the representation and/or level of abstraction used in one model to another representation and/or level of abstraction in another model. Model mapping can refer to a mapping from an information model to a data model. This type of mapping is usually exemplified through the mapping to a standards-based data model (i.e., a data model whose constructs are based on data structures and protocol elements defined in a standard). Model mapping can also refer to a mapping between different data models. This type of mapping is typified by optimizing a standards-based data model in order to take advantage of the features of a particular vendor implementation that utilizes the standards-based feature (e.g., a language or encoding).

An "object" as used herein may refer to an instance of a class, a set of instances of a set a classes, an instance of a relationship joining two classes, or generally as any acyclic subgraph of an information model. Each object may represent one or more functionalities of a manageable entity, the manageable entity (e.g., device, service protocol, system operating parameter etc.) itself, a person or organization, a behavior (e.g., policy rule, state machine, script, section of code), or a role that any of the above play within the system.

An "event" or "trigger" as used herein may refer to any occurrence or circumstance, whether active or passive, that is capable of being recognized by the system and to which the system may respond. An event or trigger may, for example, occur as the result of a "user request" or "device request" to access data within the system or network. Additionally, an event may be triggered automatically by a set of one or more conditions which may be satisfied and result in the system being provided with contextual data concerning the event. One skilled in the art should recognize that there are a variety of circumstances that may give rise to a need or desire to reconfigure an aspect of the system or network when responding to a chain of events.

"Object wrapping" as used herein refers generally to process of mapping one or more objects into a single larger object that has the functionality of its constituent components. The larger object, i.e. the stitched or wrapped object, contains a set of member variables that define each of the "stitched" or "wrapped" objects. Object wrapping, in accordance with the various embodiments, is typically directed dynamically at runtime through the execution of one or more policy rules and, in some embodiments, metadata. By implementing a system in accordance with the methods disclosed herein, the system may use information retrieved from an information model to access data elements stored in one or more data models via one or more control points. The objects represented by these data elements may be mapped to object instances, wherein one or more data elements and/or objects may "wrap" other objects by using those additional objects as member variables within the wrapped object instance. By allowing objects to wrap other object instances, behavior of a system, or its managed entities and/or assets, can be dynamically modified in a variety of ways, including at least: 1) objects can dynamically wrap other object instances; 2) individual attributes can be added to an object to support and/or modify device and/or system functionality; 3) individual functions can be added to an object to support and/or modify device or system functionality; 4) a wrapped object's functionality can be executed before it is called; and/or 5) a wrapped object's functionality can be executed after is called. The individual functions may additionally be called multiple times, such as calling a function for error checking both before and after the object's functionality has been modified.

The information and data models disclosed herein contain information showing how the instance objects may be used to account for system behavior and/or device behavior. As explained in greater detail below, object wrapping allows for creation of instance objects but does not require any of the underlying code of either the system or the targeted object to be changed or modified. Rather, object instances are being manipulated and/or aggregated to achieve functional capabilities and/or account for physical capabilities of a managed entity. Since patterns are being used within information or data models, different rules and rule types can be abstracted and used as templates to solve related problems. Thus, object wrapping allows the model to treat entities, relationships, constraints, and other elements as reusable objects, thereby providing extendibility and scalability in an unprecedented manner.

A "managed entity" can refer to any physical or logical entity that can be managed by a network operator or application, but need not represent only managed network devices. For example, a managed entity can also refer to routers, switches, busses, logical device interfaces, physical ports, users, roles (e.g., as customer), applications, system configuration settings, policies, statistics, system operating parameters, or to other entities that either directly or indirectly affects operation of a system or a system device.

A "policy rule," as used herein, is an intelligent container: it contains data that define how the underlying policy is used in a managed environment, as well as a specification of behavior that dictates how the managed entities that it applies to will interact. The contained data may be of four types: (1) data and metadata that define the semantics and behavior of the policy rule and the behavior that it imposes on the rest of the system, (2) a set of events that can be used to trigger the evaluation of the condition clause of a policy rule, (3) an aggregated set of policy conditions, and (4) an aggregated set of policy actions.

In at least one embodiment, a policy rule can be defined at various levels of abstraction. Three such levels are typically employed, but may optionally be varied. These three types of policy rules are business, system, and implementation. A business policy rule may be defined as one in which business-related concepts are defined, manipulated, and governed. Non-limiting examples of business rules include: maximizing revenue (potentially at the cost of not providing system resources to certain customers or user types to in order maximize customer or use of a particular type); ensuring that the terms of service in a Service Legal Agreement are not violated; and ensuring that certain types of users must have a particular set of credentials to utilize a system resource. A system policy rule may be defined as one in which architectural or other system-level constraints are defined, manipulated, and governed. Non-limiting examples include: a system that must satisfy high availability constraints, and hence must provide the ability to meet the needs of users and/or consumers of said system during a particular measurement interval; or that a Representational State Transfer Applications Programming Interface must be made available for all interfaces that interact with a customer. An implementation policy rule may be defined as one in which the features and/or behavior of a managed entity are specifically governed. Non-limiting examples include: defining a condition when the parameters of a given algorithm should be changed (and optionally, by what degree); and choosing a particular measurement method of a given metric or set of metrics over an alternate measurement method and set of metrics.

In general, but without limitation, business policy rules may apply to the users, devices, or services of organizations; system policy rules may apply to components, modules, devices, and systems; implementation policy rules may apply to specific data, features and/or behavior of an entity that is directly or indirectly managed. Certain embodiments of the present invention use the DEN-ng information model. A unique feature of this information model is that it can define the aforementioned abstractions and other abstractions of policy rules in the same model. By defining policy rules in a single model, certain embodiments significantly simplify the job of the developer to make use of different types of policy rules. In particular, these embodiments enable business functions to determine which networked resources and services should be offered at a particular time.

Further to the present invention, some embodiments provide an exemplary information model that allows business rules to be translated into a form that can be used to define network services, such as device configuration commands and/or network resource allocations, with or without the use of an intervening system policy rule. Business rules can refer to one or more settings and/or constraints using, configuring, monitoring and/or managing network configurations, services delivered, and/or resource allocations, such as by the type of user, the time of day a service is requested, the users authorized to implement a network configuration, etc.

An exemplary information model can also be used with a set of policy rules, of the same or different levels of abstraction, to be integrated with the representations of the business rules and the other managed entities according to the present invention. The policy rules may be defined, and represented, at a different level of abstraction than the business rules and managed entities (e.g., network commands). This supports the notion of a "policy continuum," which is a linked transition from one form of a policy rule at a higher level of abstraction (e.g., a business policy rule) to one or more forms of a policy rule, where each subsequent form is at a successively lower level of abstraction. Hence, a business policy rule that is related to at least one system policy rule, which is in turn related to at least one implementation policy rule, form a policy continuum. This allows policies to be built to proactively monitor system or network services and adjust, for example, the corresponding configurations of a system and/or of any managed entities to ensure that the business processes of a particular service is met by the devices providing those services. The term "service" refers generally to a functionality of a system or network that can be provisioned for a customer, such as a VPN service.

An exemplary information model uses common representations of various managed entities to normalize physical and logical devices, components of a device, communications, features, behavior, management operations, and abstractions of a network or system to translate these technology-independent artifacts into at least one vendor-independent data models (i.e., independent of implementation technology). The information model is used to define how different characteristics of the managed entities should be mapped as well as what form it should take in the vendor-independent data models. The information model may also guide, through the use of metadata and annotations, how technology-independent artifacts are mapped to current programming models. These two steps enable an information model to mediate between different devices and systems that represent data and commands differently, and provide a flexible and efficient implementation through the use of data models to optimize the use of at least one protocol of the at least memory comprising the management device.

An advantage of the various embodiments of the present invention is that behavior of a managed object can be changed dynamically, at runtime, without changing the code or its associated data present in memory or a repository regardless of whether the domain is network management, storage management, server management, or cloud management, or any distributed system similar thereto. The various embodiments presented enable the creation, reading, and/or modification of attributes and/or behavior of an existing network service or resource, features of an existing device, or adding support for entirely new network service, resource, and/or device, all without the need to change any underlying code.

Another advantage of the various embodiments is that they allow an information model to be extended to use a multiplicity of policy rules and languages. By decoupling the policy rule implementation from the control points of the various data models, various embodiments allow versatility, scalability and adaptability in an unprecedented manner. To these ends, the various embodiment disclosed herein provide a method and system for using policy rules to dynamically orchestrate system and device behavior before and/or after objects have been invoked via the control points.

Another advantage of the various embodiments is that methods are provided that allow objects to wrap each other and be used to dynamically specify, instantiate, manage, and remove sets of temporary or permanent additions and/or modifications to the attributes and/or behavior of a set of objects, relationships, scripts, and/or applications of a module, subsystem, or system, without having to change the code or the associated data stored in memory of these objects, relationships, scripts, and/or applications. The various embodiments provided allow instantiation of objects that are manipulated dynamically at runtime and may be stitched, or wrapped, together into reusable objects, patterns, entities (e.g., a group of objects and model elements), relationships, and/or constraints.

Another advantage of the various embodiments is that the means by which the additions and/or modifications to the attributes or behavior mentioned above is executed is defined using a dynamic object-oriented information model; it is realized using a set of mappings to a set of dynamic object-oriented data models. Specifically, these embodiments enable attributes, methods and/or relationships (e.g., associations, aggregations, and/or compositions), as well as constraints on any of these elements, to be dynamically added or changed at runtime without changing any code, or the associated data of said entities, by manipulating object instances. The means of these embodiments may be further enhanced by using a set of policy rules that interact with the dynamic object-oriented information model, and hence, the set of dynamic object-oriented data models produced from the dynamic object-oriented information model, using predefined control points. The set of policy rules enable additional behavior to be performed before or after an object is invoked via the aforementioned control points.

Figure 2:
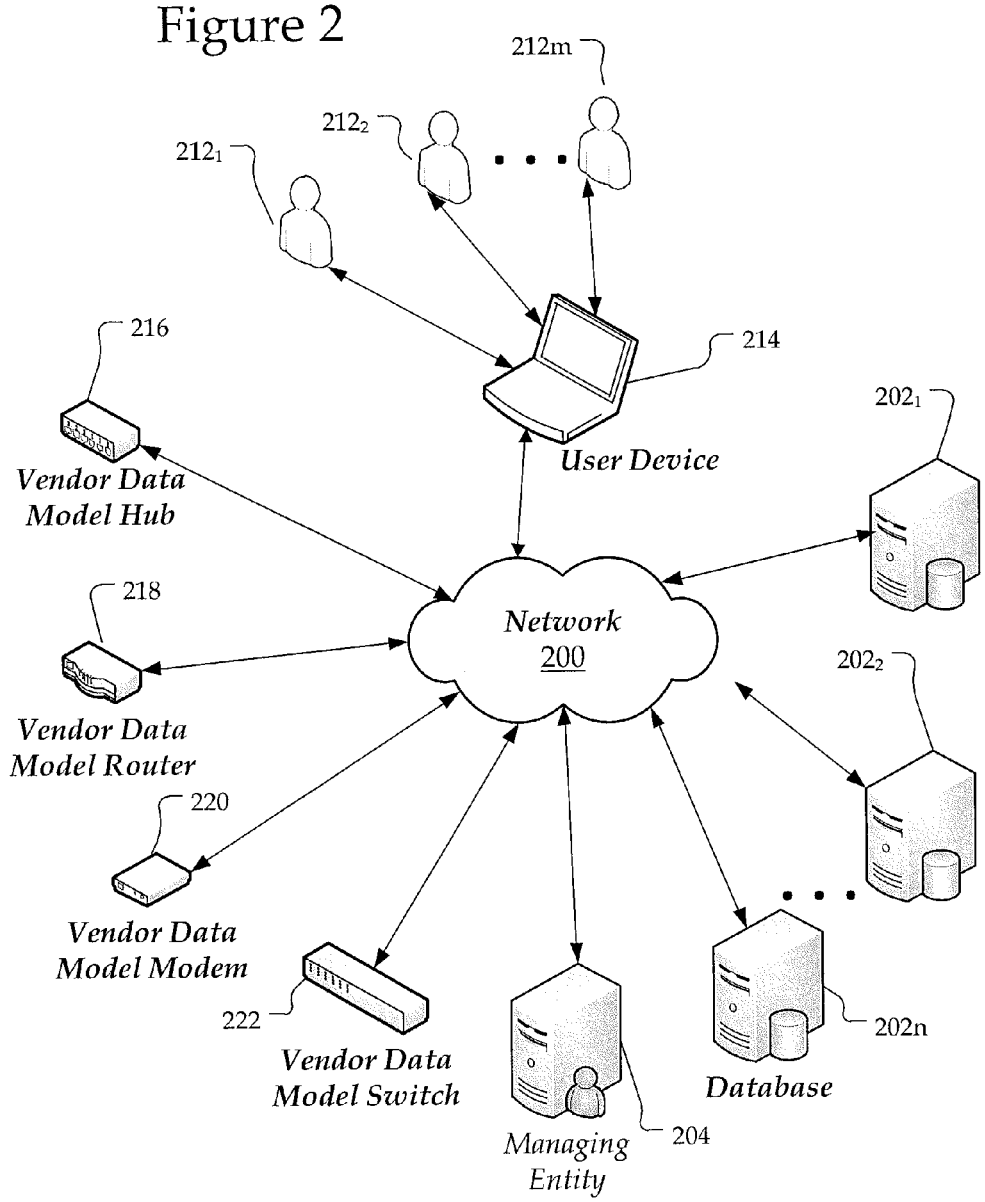
FIG. 2 is an exemplary block diagram illustrating one embodiment of an exemplary network system.

Referring now to the figures, according to one embodiment, FIG. 2 depicts a block diagram illustrating one embodiment of an exemplary network system 200. Alternatively, in other embodiments, network system 200 may be another form of management systems, such as storage management, server management, cloud centers, data centers, or the like, including any combination thereof. However, network management in particular requires a high degree of flexibility and often must be extended to accommodate new features for existing devices as well as new devices that may be released. In addition, networks serve as the foundation of a distributed system, and hence are used in all of the above forms of management systems. Thus, in one embodiment, the network system 200 may provide a platform for the identification or recognition of system events and/or system triggers in order to dynamically respond to those events and/or triggers at runtime without the need to change any underlying code, or associated data for the entities being governed, for managing and operating the network system 200 or any of its managed entities and/or managed assets. For example, network system 200 may use an information model as described above to operate in a contextual manner. In the preferred embodiment, the network system 200 uses a Directory Enabled Networks—next generation ("DEN-ng") inspired information model, as described in further detail below.

In exemplary network system 200, one or more databases $202_{1-n}$ may store abstractions that may represent the various managed entities and/or assets in a managed environment, such as an information model and one or more data models. In this context, the term "database" should not be construed to imply a relational database; rather, it is used as a generic term to represent any appropriate repository, including, but not limited to, relational databases, object-oriented databases, not only Structured Query Language (NoSQL) databases, new SQL (NewSQL) databases, directories, in-memory storage systems, Indexed Sequential Access Method (ISAM) files, flat files, and the like. The information model may be stored in the repository of one database, and various data models and policy rules may be stored in the various repositories of either the same or one or more other databases $202_{1-n}$. The information model stored in the database 202 may define information representing various device and/or system configurations, such as patterns, sets of policy or business rules of different types, data model control points, mappings between policy or business rules and the control points, and/or sets of metadata, all of which may be used to dynamically define, create, manage, and remove behavior of the network or system at runtime without changing any underlying code. Such rules, patterns, and metadata, as described in greater detail below, may store and provide information about system access authorizations, dataflow priorities, applicable business rules or other types of policy rules, device configuration, system operation parameters or configuration, etc.

Additionally, within the network system 200, a managing entity 204 is provided to recognize and dynamically respond to the system events, triggers, and/or requests. The managing entity 204 may comprise a processor and a memory. In addition, data used by the managing entity 204, and well as data required to instantiate a new instance of the managing entity 204, may optionally be stored in one or more databases $202_{1-n}$. The managing entity 204 is configured to access a plurality of program instructions and data stored within the information and/or data models, and is further configured to cause the processor to receive and process data in accordance with system events. The managing entity 204 is further configured to execute one or more processes that invokes different types of policy rules, as well as business goals, to access sets of patterns, rules, objects, and control points, in order to form a set of mappings between rules and control points that dynamically define, create, manage, and remove system or device behavior at runtime without changing underlying code or its associated data that is stored in at least one repository.

The exemplary network system 200 may also include one or more users $212_{1-m}$ that may utilize one or more user devices 214. The user devices 214 may be coupled with the network. Herein, the phrase "coupled with" is defined to mean directly connected to or indirectly connected through one or more intermediate components, either by hardwired connection or by wireless connection. Such intermediate components may include both hardware and software based components. Variations in the arrangement and type of the components may be made without departing from the spirit or scope of the claims as set forth herein. Additional, different or fewer components may also be provided.

The user device 214 may be a computing device that allows a user to connect to a network 200, such as the Internet and/or an intranet, or any other network that uses Internet Protocol technology to share information, operational systems, or computing services within an organization. Examples of a user device include, but are not limited to, a personal computer, a tablet or mobile computer, personal digital assistant ("PDA"), cellular phone, or other electronic device capable of being coupled with network 200. The user device 214 may include any operative peripheral devices that allow a user to interact with other devices or hardware over network 200 via the user device 214. The user device 214 may be configured to access other data/information in addition to web pages over the network 200 using a web browser, such as INTERNET EXPLORER® (sold by Microsoft Corp., Redmond, Wash.) or FIREFOX® (provided by Mozilla). Although not shown, there may be multiple user devices connected through the network system 200 with the system devices and/or other user devices. Each of the other user devices may include a plurality of users $212_{1-m}$ that access that user device.

The network system 200 may also include one or more devices or system resources, or "managed entities," that are currently connected to or making use of system resources, or that may wish to connect to the network system 200. As depicted in FIG. 2, exemplary managed entities may represent users, user devices, routers, hubs, modems, switches, the system resources being used by the respective devices, etc., or the like. Each managed entity is capable of being represented by one or more data models stored in the one or more databases $202_{1-n}$. For example, a router can be represented by a set of data models that represent physical and logical device information that describes the particular managed entities. In general, each data model can represent all or some information that describes a particular managed entity. For example, a router can be associated with physical information (e.g., the set of line cards that are installed in the router) as well as logical information (e.g., protocols that are running on each of its interfaces). Other exemplary logical information can include protocol information, service information (e.g., connectivity using a VPN), statistical information (e.g., data describing how well a service is running), ownership information (e.g., who owns the device, who is responsible for changing the device), security information (e.g. user access to authorization), and other like information.

Thus, the information model uses common representations of various managed entities—such as user devices 214, vendor data model hub 216, vendor data model router 218, vendor data model modem 220, and/or vendor data model switch 222—to normalize physical and logical entities of a network by performing mapping translations from current programming models to vendor-independent data models (i.e., independent of implementation technology). The information model is used to define how different characteristics of the managed entities should be mapped as well as what form it should take in the vendor-independent data models. The information model further defines a set of relations to one or more policy rules which may guide the system operation and/or response to systems events and triggers.

To perform mapping translations in accordance with an embodiment, there are either "n" sets of mappings from the information model to a vendor-independent data model, or a method by which a mapping from the information model to a vendor-independent data model can be computed dynamically at runtime, stored in one or more repositories—such as databases $202_{1-n}$ or memories located on user devices 214, vendor data model hub 216, vendor data model router 218, vendor data model modem 220, and/or vendor data model switch 222—in a form appropriate to each of the repositories. The "n" sets of mappings are the number of relevant data models, where each mapping to a unique repository is due to at least different access protocols, storage structures, and/or other characteristics that differentiate its implementation. In at least one embodiment, one repository is a directory and another repository is a relational database, or any other known database.

Optionally, there may be additional "m" sets of mappings, each of which results in a mapping of a data model (e.g., stored in a repository) to a vendor-specific (i.e., optimized) implementation, such as one or more different "m" number implementation for each vendor-specific product. Each of the "m" sets of mappings is used because different vendors and physical entities implement the same or similar features (e.g., software, commands, etc.) differently as well as the functions performed thereby. As such, a single mapping can exist from an information model to a data model stored in a specialized form for a given type of repository or system device or managed entity. But many mappings may exist to map from the specialized form of the data model to implement different vendor's commercial products of the repository or managed entity.

Further describing an embodiment of the present invention, different software features (e.g., traffic conditioning, link aggregation, etc.) that are implemented using different functions (e.g., different queuing algorithms, different commands, etc.) can also be normalized for representing logical characteristics in a common way, such as by using a single model. Such a common representation enables mapping of the same or equivalent functionality supported by two managed entities even though the mechanisms by which that functionality is supported are different. By representing logical characteristics in a common way, those different managed entities requiring a combination of commands to effectuate functionality in a manner similar to other managed entities are mapped those managed entities thereby requiring as little as a single command for performing a similar functionality. With a common representation, it becomes possible to coordinate the different commands of different managed entities to provide a common service.

According to an embodiment, different software features can be mapped onto different hardware to enable a network operator to design a network architecture that is independent of any one vendor's hardware and/or software implementation. Consequently, one or more hardware and/or software features, as "managed entities" of network devices, can be enabled or disabled through software regardless of whether an administrative model is different than a corresponding programming model. Thus, the administrative capabilities of a device can be abstracted into a common representation, so that the functionality of different devices can be managed and coordinated concurrently in accordance with business processes as defined, for example, by business rules or other types of policy rules.

Figure 3:
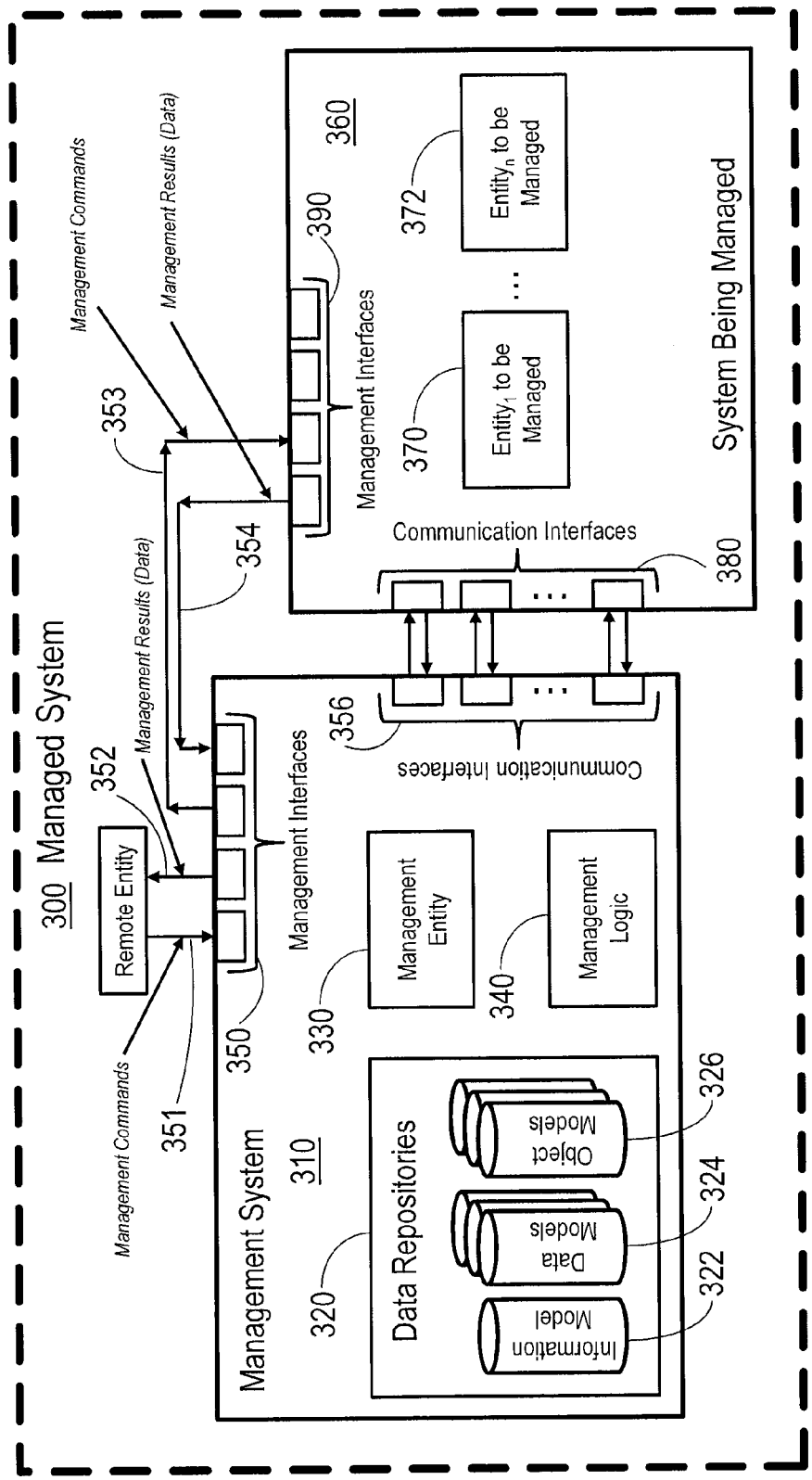
FIG. 3 is an exemplary block diagram of a system being managed in accordance with certain embodiments.

Referring now to FIG. 3, an exemplary diagram of a managed system 300 is shown. The managed system 300 includes a management system 310, a system being managed 360, a set of one or more entities to be managed 370, 372, dedicated management interfaces 350 for communicating management data, requests, and commands 351, 352, 353, and 354, and various communication interfaces 356 and 380. The management system 310 includes a set of data repositories 320, a management entity 330, management logic 340, dedicated management interfaces 350, and generic communications interfaces 356. The data repositories are shown in FIG. 3 in their most generic form, which separates them by function. The information model 322, the at least one data model 324, and the at least one object model 326 may each be separate repositories within one or more databases that may be implemented using different platforms, languages, and protocols. In the preferred embodiment, use of separate repositories allows for maximal use of the properties of different repositories, including matching said properties to management operations. However, various other embodiments may combine the various repositories into one or more repositories, thereby reducing the total number of repositories utilized.

In at least one embodiment, the dedicated management interfaces 350 consist of at least one port to receive remote management commands 351 and one port to send management data 352. This enables communication with other remote entities, which may be other management systems. For example, an Operational Support System (OSS) may be made up of one or more Element Management Systems (EMSs) and one or more Network Management Systems (NMSs), since not all EMSs or NMSs provide the same functionality for managing different vendor devices. Similarly, two additional dedicated management interfaces enable the management system 310 to deliver commands to the system being managed 360 via dedicated interface path 353 and receive data from the system being managed 360 via dedicated interface path 354.

The system being managed 360 includes a set of dedicated management interfaces (dedicated interface path 353 for receiving management commands from the management system 310, and dedicated interface path 354 for sending management data to the management system 310). The system may also include optional management interfaces for communicating with other entities (e.g., an EMS that is not part of this managed system). It may also include a set of generic communication interfaces 380, as well as a set of entities to be managed 370, 372.

Figure 4:
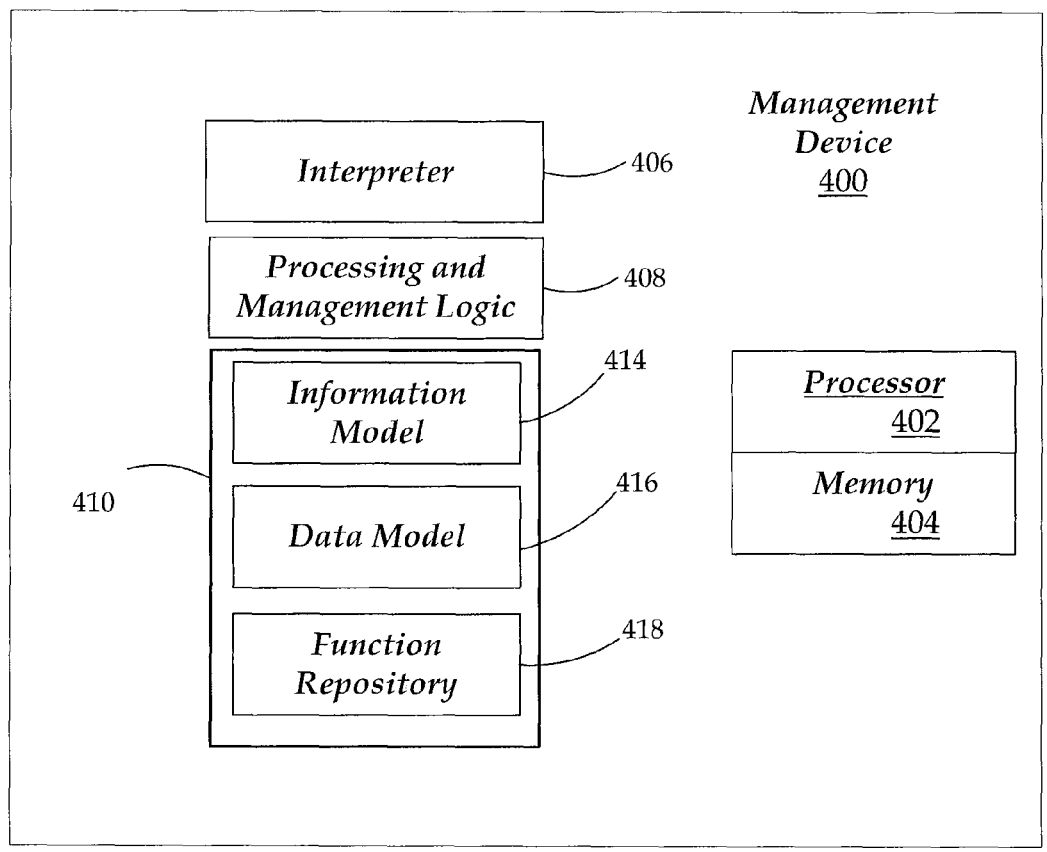
FIG. 4 is an exemplary block diagram of a management device in accordance with certain embodiments.

Referring now to FIG. 4, an exemplary diagram of a management device 400 is shown. The management device 400 includes a processor 402 and memory 404. A management device 400 may include one or more of an interpreter or compiler 406. The interpreter or compiler 406 may execute commands and programs, as well as appropriate processing and management logic for governing manageable entities. Management device 400 may also include one or more repositories 410 containing an information model 414, data model 416, and an optional function repository 418. Alternatively, one or more of the interpreter or compiler 406, processing and management logic 408, and repository 410 may be operatively coupled to the management device 400. Conceptually, the management device 400 may be viewed as a processor and memory located within a single machine, or work as part of a distributed system where some or all of the various components may be accessed by the system to achieve the same functionality as described herein. In one embodiment, the management device 400 is a system that implements the information model and repository of objects, as well as communicates with managed entities. Management device 400 is capable of responding to system events or triggers in order to execute one or more processes that dynamically define, create, manage, and remove entity features or behavior at runtime without changing any underlying stored code.

In one embodiment, the management device 400 is coupled to an information model 414, which may be stored in one the system databases $202_{1-n}$. The management device 400 may also access one or more data models. Each data model 416 may also be stored in one of the system databases $202_{1-n}$. In the preferred embodiment, the information model and each data model may be stored in separate databases to account for the use of a different platform, language, and/or protocol, if necessary. Such separation provides increased protection for the information model and maintains data integrity. It is contemplated that multiple data models may be used where a management system desires to make use of specific features (e.g., query support, or referential and data integrity, or the ability to process structured, unstructured, and semistructured data). In which case, it may be preferential to allow for use of distinct types of repository structures.

Further, each type of data model 416 may include one or more control points. The control points will typically be inherited from the data contained in the information model 414, and represent concrete points of access allowing applications and system developers to interface with the data to support system functionality. Accordingly, each control point facilitates the injection of dynamic behavior into a set of objects, relationships, scripts, and/or applications of a module, subsystem, or system, without having to change the code of those objects, relationships, scripts, and/or applications. Via access to the information model 414 and one or more data models 416, the management device 400 encourages reusable object instances, especially in the form of patterns, to be built. Patterns increase the reliability and efficiency of the system, since their corresponding implementation benefits from multiple, repeated use. In addition, patterns enable the developer to more quickly understand a complex system, since the same concept is repeatedly used. Hence, the reliability and efficiency of the management system also benefits by the use of patterns. Thus, within a network system, entities, classes, attributes, relationships, and constraints are reusable and may be assembled into reusable objects that can be applied dynamically to solve different classes of problems. In this way, the present invention allows a system to leverage patterns (both new and existing) to simply complex management tasks, including monitoring and configuring network devices.

In another embodiment, the information model 414 also facilitates application of policy rules to be used to control the changes that may be required to be coordinated among different data models. In order to change the data model without changing any code, the system stores object instances that are identified by the information model and/or data models and mapped to the context of a particular device or to a particular aspect of a system request. Accordingly, one data model may identify a single object instance in a way that is fundamentally different than other data models Through mapping and use of policy rules, as further described herein, the information model 414 may be used as a mechanism to link together disparate data models. The meaning and intent of a policy rule may be defined by the information model 414, and the management device 400 may use this information map those policy rules to specific data models 416 in order to add and specify functionality appropriate to a particular application or use of the policy rule at runtime.

The management device is generally configured to recognize event triggers in order to cause the execution of one or more processes that may invoke various types of business, system, or implementation policy rules. For example, each type of policy rule may access sets of patterns, rules, objects, and control points, in order to form a set of mappings between rules and control points that allow the managing device to dynamically define, create, manage, and remove system or device behavior at runtime without changing code or its associated data present in memory.

Figure 5:
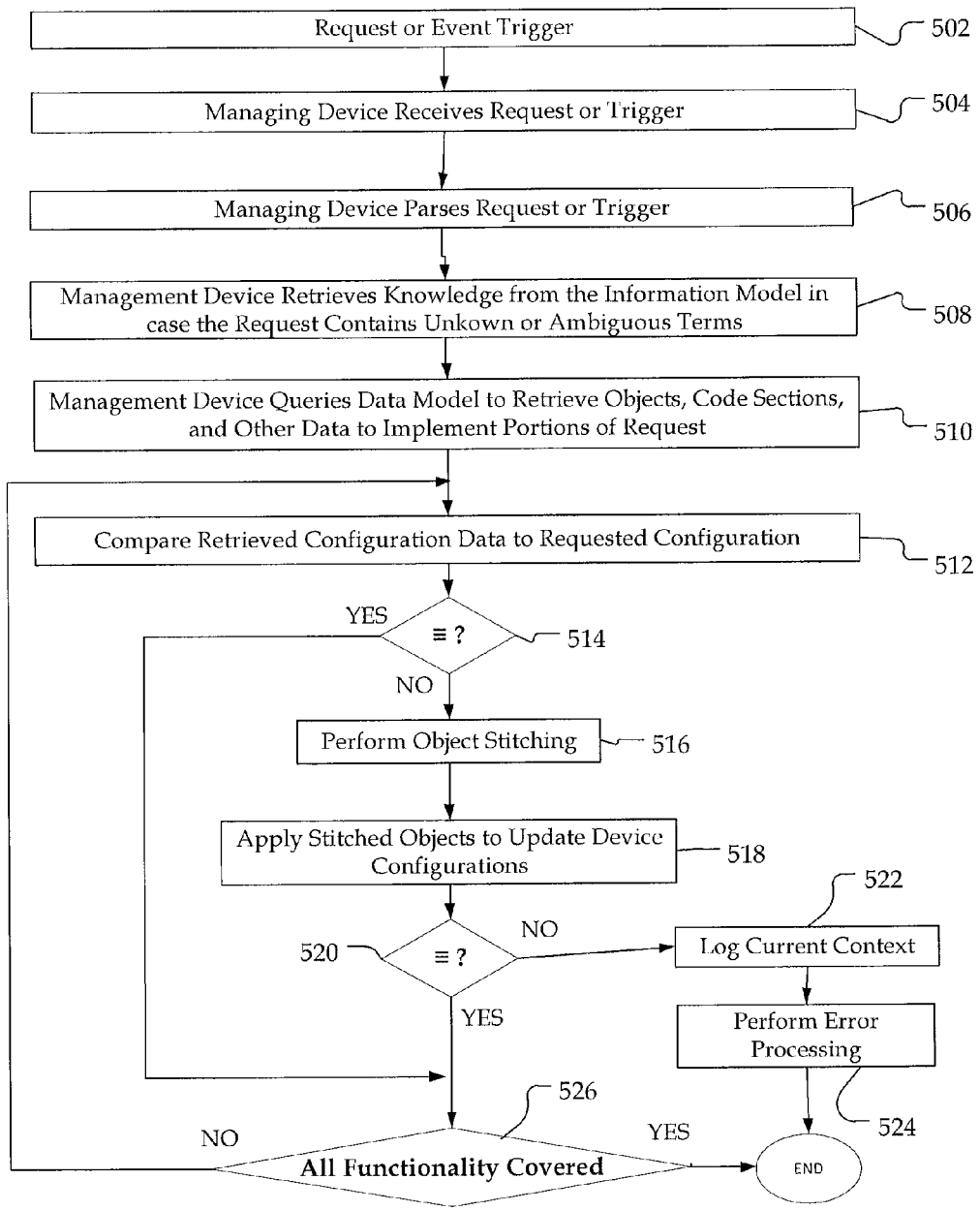
FIG. 5 is an exemplary flow diagram of operations occurring between the management device and one or more entities in the managed system, illustrating the use of events and triggers in accordance with certain embodiments.

FIG. 5 is an operational flow diagram for recognizing and processing an event trigger. At block 502, an event trigger may occur within the system or network. As further described herein, an event trigger may occur as a result of a user request, device connecting to the network, or occurrence of some circumstance satisfying one or more conditions defined by the system. An event may be an indication of a significant occurrence of interest to the management device 400. A trigger may be a type of event that is used to indicate to the management system 400 that one or more actions are desired of the management system.

At block 504, the management device 400 may recognize the occurrence of event trigger and begin to process the request or trigger at block 506. In at least one embodiment, the management device 400 may process the request in accordance with different types of policy rules that are defined by the information model. For example, the management device 400 may use a parsing process as explained in further detail in FIG. 7.

At block 508, the managing device may examine the parsed output of the request or trigger. If the request or trigger contains terms from the parsed output that the management device does not understand, then the management device may query the one or more data models 416 to retrieve data, code sections, and/or object instances that are required to understand and then implement portions of the request, as further explained in connection with FIG. 9.

At block 510, the managing device 400 processes the request using data retrieved from information model 414. The data retrieved from the information model may include code sections, objects, scripts, policy rules, and other data and information required to implement all or portions of the request, as further explained in connection with FIGS. 10a and 10b.

At block 512, the managing device gathers the operational, administrative, management, and/or performance data retrieved from the set of managed entities that are being governed in order to compare the data to the one or more data elements stored in the one or more data models. At block 514, the gathered data and the desired data are compared to determine if they are deeply equal (i.e., objects are not only of the same type, but their attributes, constraints, and relationships are also the same, which is indicated by the "identical to" symbol, $\equiv$), thereby ensuring that the syntax and semantics of the two objects are the same. If yes, then execution continues onto block 526. This process applies recursively for each model element, such as may be the case with arrays. At block 514, the deep equality determination also checks for null equality.

If the determination at block 514 is no, then object stitching may be required. The managing device 400 performs object stitching at block 516, by stitching (i.e., "wrapping") the appropriate data elements and/or objects contained in the one or more data models into a single stitched object. This object wrapping may further be defined or directed by the one or more types of policy rules that are obtained from the information model, and thus, occurs dynamically at runtime during the processing of the response to the event or trigger. In complex requests, multiple objects may require stitching, as explained in further detail in connection with FIG. 13.

At block 518, the management device may apply the stitched object(s) to update the configuration of all affected devices, potentially including additional devices that were not originally part of the set of devices that were being monitored. For example, if a monitored device interface suddenly becomes congested, it may be necessary to examine other parts of the network to determine the cause of the congestion. Furthermore, the solution to this problem may involve changing the configuration of devices that were not originally monitored. For simplicity, this and the following blocks will be described as if each change that is to be applied is separate and independent. In complex networks, however, it may be preferable to categorize all configuration changes and order them by dependency in order to enable groups of changes that do not interact with each other to be applied concurrently. In such embodiments, the configuration to be applied by the stitched object(s) would likely be tested to see if the proposed configuration changes will work in the targeted environment and whether the requested changes is safe to do at the current time.

At block 520, the management device checks to ensure that the configuration update was correctly applied (e.g., by checking if new or altered services and/or resources changed by the stitched object(s) are operating as expected). If not, then the management device logs the current context at block 522 and initiates error processing at block 524. The nature and type of error may determine whether operation can be resumed, and at what block the process needs to begin. If the configuration update was successfully applied at block 520, then the management device may check to ensure that all of the functionality and capabilities for processing the request are accounted for at block 526. If yes, the process completes. If this determination at block 526 is no, then the process returns to block 512, where the management device executes one or more processes as may further be defined by various types of policy rules, to examine the wrapped object and data retrieved from the set of managed entities in order to determine which objects and/or data elements are needed to account for the remaining functionalities or capabilities and/or changes in behavior that are required. The process continues this loop until all of the requested functionality has been provided, as indicated by a yes at block 526, at which point the process completes.

In accordance with the flowchart shown in FIG. 5, various embodiments are able to use policy rules to define and respond to triggers or events dynamically at runtime without needing to modify or change code. The object stitching (also referred to herein as "wrapping"), which typically occurs at the data model level, allows one object to be used as a member variable of a larger and more comprehensive, stitched object. Moreover, the stitched object may be further modified, extended, and reused according to the various policy rules in order to account for new attributes or new methods that are needed by future requests. For example, once the stitched object is created, it may be saved into a library or repository, just like any other object. This allows the methods practiced in accordance with the current embodiments to reuse stitched objects individually and to create more complex objects (which may also be saved), as well as create, define and use patterns to inject dynamic behavior into a system without requiring the system at runtime to be taken offline for maintenance or updating. More importantly, if the managed system contains context-aware components (e.g., components that produce different resources and/or services based on different contexts), object stitching may also be used to provide such resources and services as the context changes.

The dynamic adjustment of attributes is further triggered using a management device having context awareness of events. However, in preferred embodiments, the management of the dynamic behavior may also be governed and controlled by the defined set of applicable policy rules. Using policy rules to control and orchestrate the dynamic behavior of the system provides immense scalability for increasing number of system changes and specifying new or different system behaviors. This scalability allows for rapid prototyping of new devices wherein companies can easily engage in with what-if analysis with the system to extend additional functionality and capabilities to their devices. For example, in the DEN-ng model, as further described herein, the policy rules allow orchestration to define the behavior of a set of managed entities from the point-of-view of other managed entities. In this manner, the DEN-ng model allows construction of a sub-model of behavior, which in turns allows the policy rules to define and control the behavior of the managed entity. This further facilities difficult networking concepts, such as orchestration and choreography of managed entities and their relationships, to be more easily conceptualized and defined. Thus, the models and patterns described herein provide inherent extensibility that can accommodate new system requirements through the use of context-aware policies without changing the system infrastructure.

As a non-limiting example of a contextually aware system using policy rules to dynamically respond to triggers or events, a user device 214 may be connected to a company intranet or network. The user device 214 may be a PDA, cellular phone, or tablet computer, and the user device may be in coupled communication with company network and providing GPS or similar tracking information. The user of the device may be operating the device from a secured location, but may exit the secured location and enter into a common, unsecured area. At this time, pre-conditions regarding the device location will be satisfied and trigger an event within the network. The management device or entity may be configured to recognize and process this event in accordance with various types of policy rules defined in the information model. For example, the management device may be able to take any number of actions, such as disabling access to secured data resources, or rerouting the connection through a firewall, or disabling any currently connected VPN. Such actions can also be described as "service chaining," when referring to Software-Defined Networks. While this concept illustrates a basic example of dynamically responding to a single system event, one skilled in the art will recognize that the nature of the system events and underlying operation of the network may be extended using the methods further described herein to dynamically respond to a variety of distinct event types that may occur across a network platform.

Additional embodiments further allow for the use of metadata embedded in system triggers to drive the context-aware policies and drive the dynamic modification of object attributes and behaviors. As described below, the embodiments may use policy rules to meet the needs of a particular system's use or application. However, the information models in such embodiments may further define multiple types of metadata for each type of policy rule used. Further, in certain embodiments, metadata may be used to drive the dynamic changing of services and/or resources that are offered as a function of context (e.g., time, date, amount of congestion in a network path, percent of memory used, and the like). A preferred embodiment uses the DEN-ng information model as an information model that couples a rich hierarchy of managed entities with a rich hierarchy of metadata, as illustrated in FIGS. 6a and 6b.

Figure 6A:
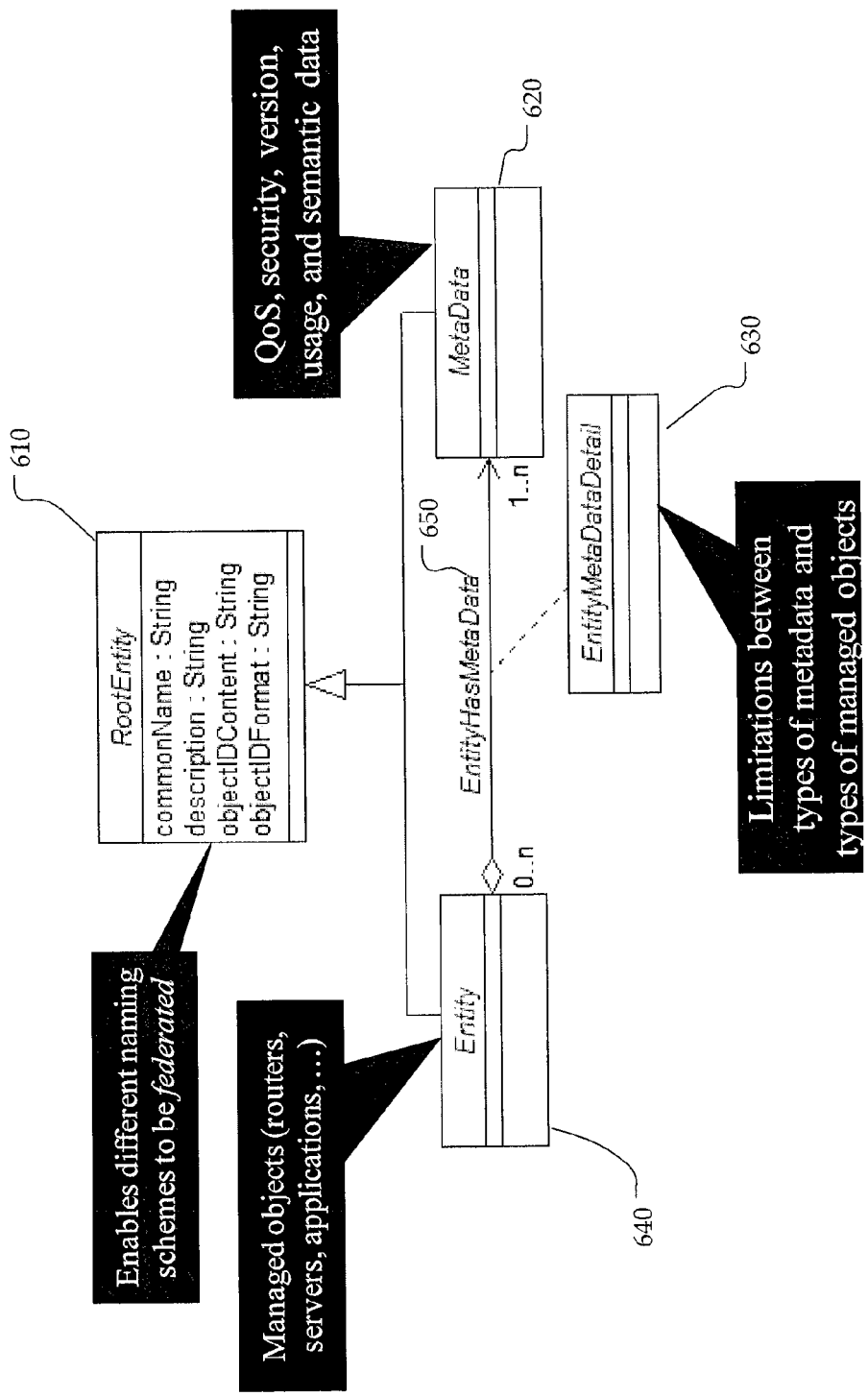
FIG. 6a is a simplified class diagram illustrating the top classes of the DEN-ng information model and the attachment of metadata to object instances according to the DEN-ng model.

Referring now to FIG. 6a, three of the four classes that make up the top of the in DEN-ng information model are illustrated, along with an aggregation (i.e., between the Entity and the MetaData classes) and an association class (i.e., EntityMetaDataDetail) to implement the aggregation. RootEntity class 610 is the top of the DEN-ng class hierarchy. The attributes in RootEntity class 610 enable a management device to name, describe, and identify all objects of interest in the environment. Entity class 640 is an abstract class that extends the RootEntity class 610 in order to represent classes of objects that are important to the environment being managed. An instance of Entity class 640 represents objects that have a separate and distinct existence, and is typically more than a collection of attributes or an abstraction of behavior, which in DEN-ng are represented by the Value class (another subclass of RootEntity, not shown in FIG. 6a). The subclasses of Entity class 640 may play one or more business functions, as well as represent characteristics and/or behavior of the entities in the environment; the immediate subclasses of the Entity class 620 are shown in FIG. 6b. MetaData class 620 is an abstract class, and defines information that describes, but may not directly contribute to or impact, the state of the Entity or Value that the MetaData is applied to. In DEN-ng, for example, classification theory is used to ensure that Entities and Values preferably contain only characteristics and behavior that are required to define the Entity or Value; all other descriptive and informative data are typically described in MetaData that are attached to Entities and Values. EntityHasMetaData 650 is an aggregation that defines the specific types of MetaData 620 that are associated with a particular Entity 640. This aggregation is used to constrain and qualify the semantics of which MetaData 620 are used to add meaning to which Entities. The semantics of this aggregation are typically defined by the EntityMetaDataDetail 630 association class. EntityMetaDataDetail 630 is an abstract association class, and defines the semantics of the EntityHasMetaData 650 aggregation. This association class contains the attributes and relationships that are common to specifying how Entities 640 and MetaData 620 are associated with each other. Since there are different types of Entities and different types of MetaData that can be associated with each Entity, the EntityMetataDataDetail 630 class is abstract, to enable the type-object pattern to be used to build an appropriate set of concrete subclasses to model the different semantics that could exist between different Entities and different MetaData. The DEN-ng Policy Pattern may be used to apply context-aware policy rules to an association class. In this way, as context changes, the actions executed by the policy rule can change the attributes, attribute values, methods, and method execution according to application-specific needs.

Figure 6B:
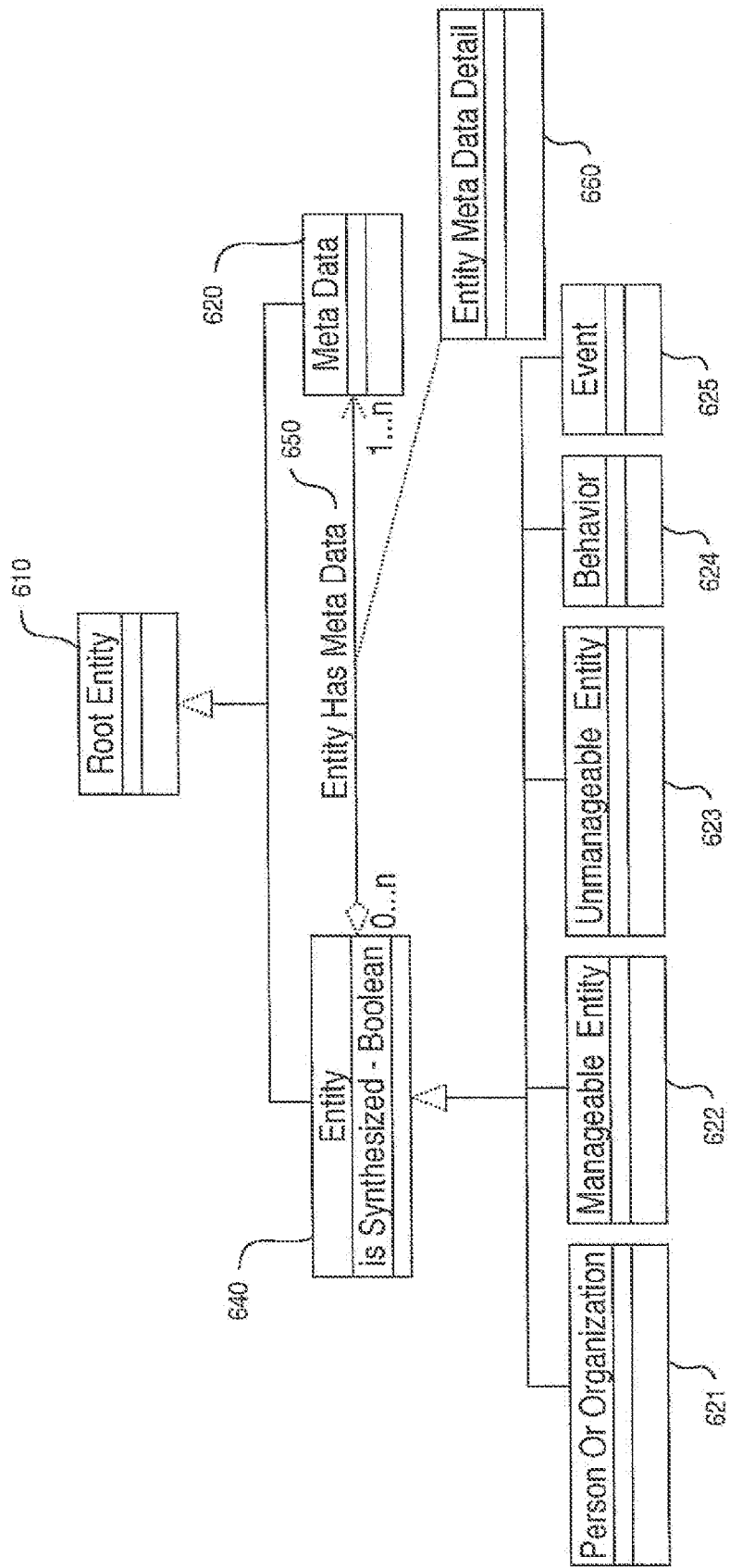
FIG. 6b is a simplified class diagram showing additional subclasses of the Entity class in the DEN-ng model.

FIG. 6b shows five subclasses of Entity 640 in the DEN-ng model. Since the Entity 640 class defines the EntityHasMetaData 650 aggregation, all of its subclasses inherit this aggregation. This means that each subclass 621, 622, 623, 624, 625 shown in FIG. 6b also inherits this aggregation. Hence, any Entity subclass can have metadata attached to it.

In embodiments employing the above described methodology, the request or event trigger may likewise include metadata embedded therein which may then be used to further drive the contextually-aware policy rules. For example, as shown in FIG. 6b, Event 625 is a subclass of Entity 640, and hence inherits the EntityHasMetaData 650 aggregation, thereby allowing the system to read and dynamically respond to the metadata contained in the event or trigger. In this case, the management device may process metadata included within the request in accordance with the flowchart from FIG. 5 in order to take any action in accord with the applicable rules driven by the metadata. For example, in the previous example of a user device being operated within a company intranet or network, the user device may be the device operated by the president of the company's, or the lead engineer. The user device may therefore have additional access authorizations allowing it to access security levels or secured data which may be restricted in tiers of access, for example. Alternatively, the user device may also have usage priority authorizations embedded in metadata which allows the managing device to recognize that the originating device has, for example, priority access to bandwidth when operating within the network.

Importantly, the particular nature of the request or event trigger is broad and need not be limited by the examples discussed herein. One skilled in the art should recognize that a system implemented in accordance with the presently disclosed embodiments is capable of responding to a vast collection of events in accordance with the methods described herein. The ability to provide business and policy rules to dynamically drive responses to, or store contextual information within, a system event, device, or trigger, is limited only by the nature of the actions which may be accounted for by the particular policy rules or the type of data that is capable of being described by metadata.

Figure 7:
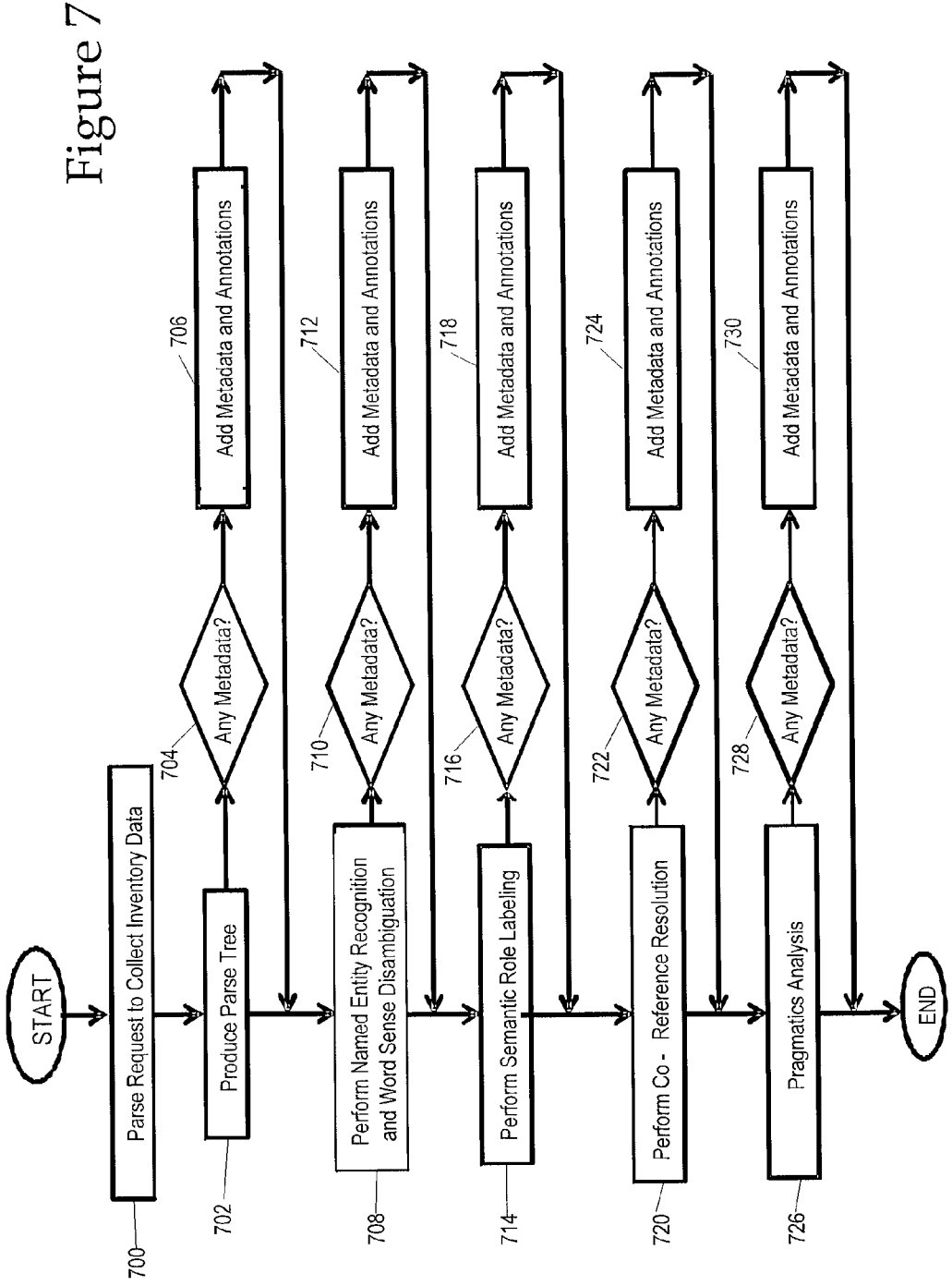
FIG. 7 is an exemplary flow diagram of operations directed by the management device for parsing a query or trigger, in accordance with certain embodiments.

Referring again to the figures, FIG. 7 is an operational flow diagram illustrating one example of a management device parsing an event and/or trigger. In certain embodiments employing the DEN-ng approach described above, all types of events and triggers may be handled in substantially the same way. In the event that that special processing is required, the standard parts of the custom events and metadata will be detected and interpreted in order to allow the management system to dynamically process the request at runtime without having to be recorded. At block 700, the request is parsed, and a parse tree is produced at block 702. Any type of parse tree may be used, though a preferred embodiment may use a constituency-based parse tree, where the grammar differentiates between terminal and non-terminal categories. Further, the system context, including when the parsing operation was started and completed, as well as any other data (e.g., special libraries or routines that were called by the parsing process in order for it to complete), may be recorded as metadata and/or annotations at blocks 704 and 706. For example, the DEN-ng information model allows for an annotation to be added as a type of metadata. However, other information models may choose to differentiate between metadata and annotations. If this is the case, both types of information may be added in block 706.

The management entity may perform named entity recognition at block 708. Block 708 may further include word sense disambiguation. In general, a named entity is an Entity that is an instance of a pre-defined category of interest, such as the name of a device, a location, an IP or MAC address of a device, or even a date or time expression. Such Entities typically have special significance in data processing operations. However, when occurring in free text, named entities may be difficult to recognize due to different variations in their declaration or use (e.g., "Dr. Smith" vs. "Harold" vs. "Harold Smith, Ph.D."), ambiguity (e.g., is "June" a Person or the name of a Month, or is "Washington" a Person or a Location), usage (e.g., "edge router" vs. "core router"), sentence structure (e.g., the presence or absence of different parts of speech, punctuation, spelling, spacing, and the like), and the like. Hence, different types of disambiguation may be preferred. These take the form of different processes, such as format detection, tokenization, sentence splitting, part of speech tagging, and others, some or all of which may be employed in block 708. At blocks 710 and 712, any metadata or annotations may be detected and added as part of this process.

Further, at block 714, the management entity may optionally perform semantic role labeling. Semantic role labeling typically identifies constituents that fill a semantic role for each verb in a sentence (e.g., the arguments to a predicate). For example, a management entity may use a combination of a manual classifier augmented with various types of machine learning (e.g., for determining starting and ending positions for each argument that is associated with a verb), enabling supplemental linguistic information to be combined with linguistic and structural constraints by explicitly incorporating inferences into the decision process. At blocks 716 and 718, any metadata or annotations may be detected and added as part of this process.

At block 720, the management entity may optionally perform co-reference resolution. Co-reference resolution may involve identifying entities that are related to each other in different sentences (e.g., "Find an edge router that has at least one congested port. Fix the port.") At blocks 722 and 724, any metadata or annotations may be detected and added as part of this process.

At block 726, the management entity may optionally perform pragmatics analysis. Pragmatics analysis may involve mapping a sentence to its intended meaning. This may be accomplished using a set of transformations that use a set of beliefs and goals. At blocks 728 and 730, any metadata or annotations may be detected and added as part of this process.

While FIG. 7 makes reference generally to a network system, the network system may be another form of distributed management system, such as storage management, server management, cloud centers, data centers, or the like, including any combination thereof. In accordance with the preferred embodiment, an information model as further described herein has been provided and stored in a database, such as one or more databases $202_{1-n}$ of FIG. 2. Additionally, in accordance with that information model, a full topology has been created for example using methods, for example, disclosed in U.S. Pat. No. 8,019,838, which is herein incorporated by reference, which describes a process of using an autonomic manager to construct Extended Finite State Machines ("EFSMs") in order to govern the operation of a network element based on a set of available commands and their effects at any particular state. Once an EFSM for a network element has been created using the process as described therein, the autonomic manager can orchestrate the autonomous operation of a network element to ensure the network element is configured to meet the service requirements defined by policies. The operation of a network element is governed by policies at the network level wherein higher level policies determine the operational and service requirements of network elements. In addition to the methods disclosed therein, various embodiments of the present invention utilize policy rules to further orchestrate the autonomous operation of a network element to add or modify the behavior of a network resource as further described herein. Additionally, various embodiments provide extendibility beyond recursive construction of state machines. Specifically various embodiments are capable of representing, recognizing, and dynamically responding to a much broad range of network resource or object behavior within a network system at runtime and without needing to alter any underlying code.

For example, referring back to FIG. 5, at block 502, the system may receive a request and/or event trigger. As depicted in step 502, the request may result, for example, from a new device connecting to a network and initiating a request via dynamic host configuration protocol ("DHCP") or domain name system ("DNS") query, Cisco discovery protocol ("CDP"), link-layer datagram protocol ("LLDP"), or similar communication protocols.

At block 504, the management device 400 recognizes and dynamically responds to the request and/or triggered event by parsing the request and/or triggered event in block 506. At block 508, if the parsing of the request and/or triggered event results in the discovery of one or more unknown and/or ambiguous commands, then the management entity 330 retrieves appropriate information from the data repositories 320 to resolve the issue. For example, in the context of the exemplary system of FIG. 3, the management entity 330 receives a set of management commands from the EMS through its dedicated interface 351. The commands are parsed by the management entity 330, analyzed by the management logic 340, and result in a set of commands being issued to the resource being managed 360 (e.g., a network device). For example, in a non-limiting example, at block 510, the management entity 330 may retrieve a set of performance metrics from the data models. The data model contains a logical representation of the device being managed, and consists of a set of classes that represent its configuration, capabilities, current performance metrics, and the like. The management commands from the management system 310 are sent over the dedicated management interface 353 to the device, which executes the commands and sends the resulting data back to the management system 310 via the dedicated management interface 354. A typical, but non-limiting, example is to use these queries to calculate the current state of the device, so that it can be compared to its desired state.

At block 512, the management entity 330 then compares the retrieved data from the device being managed to the ideal values of those data. For example, in one embodiment, the management entity 330 may retrieve a Service Level Agreement, or policy rules that describe what action to take if congestion is detected on a device interface, or the like, in order to determine what the ideal values are. At block 514, if the result of the comparison is true, then the current state of the device being managed is equal to the desired state, and all functionality is covered as in block 526. If the result is no, then at block 516, corrective action is taken using object stitching, as is further described in connection with FIG. 13. The object stitching operations are sent over the dedicated management interface 353, and results of those operations are returned over the dedicated management interface 354. The management system 310 analyzes the results and then replies back to the EMS over the dedicated management interface 352, informing the EMS of the results.\

In accordance with embodiments herein, the management device 400 may further process the request in accordance with the one or more types of policy rules described herein and defined by the information and/or data model. Additionally, a combination of metadata and context-aware policy rules may be used to implement the system configurations. For example, network management processes may involve collecting data, making a decision based on that data based and, potentially, their current values when compared to a desired set of values, implementing a set of configuration changes, and then testing the network to see if the configuration changes the situation.

In additional embodiments, the management device may determine one or more services or features requested by the event and/or trigger by issuing a similar series of queries and commands. For example, a request for the creation of a private virtual local area network ("VLAN") to transport data, priority access to bandwidth, or other similar modified connections may involve queries as to the current status of various devices in the network and their current use of resources. Once this is known, then the management device can issue a set of commands to perform the request, either on the original targeted device, or on another suitable device (or set of devices). Alternatively, if it is imperative that the originally targeted device is used, then the management device may change the configuration of other devices, which may offload the targeted device and free enough resources of the targeted device to enable it to support the new request.

The entire sequence of actions may also be directed using one or more types of policy rules obtained from mapping model elements in the information model to model elements stored in one or more data models. Using information obtained from processing the request at step 506, management device 400 compares the device configuration with the proposed configuration defined by the data elements at block 512 in order to determine whether the data elements are sufficient to allow operation or configuration of the device in the manner requested and/or specified by the applicable policy rules. At block 518, the management device 400 may apply the stitched object(s) to update the device configuration, as explained above. The remainder of the process proceeds as previously described for FIG. 5.

In certain embodiments, the methods disclosed in accordance with FIG. 5 may be used by a management device of a system, e.g. a management device of a networking system, server, or any distributed environment, to further process requests using metadata, as further described herein. Such networking systems, for example, may employ the method described in further detail by FIG. 5. In such embodiments, a new vendor specific model of a device may issue a DHCP query. The vendor specific device may optionally add metadata to the DHCP request. Such metadata may, by way of non-limiting example, provide additional information about the device itself or the context from which the DHCP request was sent. The context of such data described by metadata is not limited by the examples provided herein and may include wide range of data, from links to personal profiles, standards or best practices, priority authorizations that may be used to affect system traffic flow, or any other multitude of data contexts that may be recognized by the system in order to trigger the execution of business rules and/or system exclusions. Such data may be intentionally included within the DHCP request by the initiator or may be stored by the back-end of the system processing the request, wherein the system may automatically embed information within the request, such as describing the location from which the request was sent, or the time of day, or known user authorizations associated with the user device, or any other context surrounding the request or event trigger that may be relevant to the request.

As used herein, "metadata" refers to sets of metadata (i.e. data describing other data or a set of objects) that are used by the various embodiments to further dynamically define, create, manage, and remove behavior at runtime without changing code. By way of example and without limitation, metadata may be either structure metadata and/or descriptive metadata. Structural metadata contains information used to describe the structure of computer systems and/or computing devices. Structural metadata may also provide a description of how the components of a device or object are organized. For example, structural metadata may describe device configuration or layout, such as the number and layout of ports on a router or any other physical capability that may span multiple physical devices. For example, a given line card manufactured by vendor "A" may have eight physical ports of a given type (e.g., "Ethernet"), whereas a different line card manufactured by vendor "B" may only have four physical ports of that same type (e.g., Ethernet). Structural metadata may take into account this and other types of physical capabilities of a managed entity.

Descriptive metadata contains information used to describe details or aspects of an objections creation, use, or purpose and may be used to, for example, locate the object, such as by function, title, creator, description, keywords, or function. Descriptive metadata may also describe information about the context which an event, trigger, or event giving rise to a trigger was performed. For example, descriptive metadata may provide information regarding the location, time of day, or nature of the event or trigger. Descriptive metadata may also contain descriptions of the user of the device or device itself from which the event or trigger originated, such as user or device security authorizations, dataflow priorities, default languages, historical behavior, etc.

Metadata may be embedded in any medium that is suitable for storing the particular type of data, such as protocol requests, user triggered events (e.g., based on GPS or swiping of security credentials to access areas of a building covered by a network), emails, SMS messages, video, policy enabled desktop control, VPN connections, queries within a server, or any other multitude of events and/or triggers which it may be advantageous for a system or network to recognize and dynamically respond to. Advantageously, and in one embodiment, metadata may be considered one form of a policy rule of any type and level of abstraction. In this embodiment, metadata may be information attached to the use of different types of policy rules.

In accordance with various embodiments disclosed herein, an information model may be provided representing abstractions and capabilities of the various entities in a managed environment. In the preferred embodiment, a Directory Enabled Networks ("DEN-ng") information model is used is used as part of the implementation. U.S. Pat. No. 7,542,956, which is herein incorporated by reference, describes a process for providing and deriving DEN-ng information models, data models, and ontology models according to the DEN-ng methodology. DEN-ng information models, as extended in accordance with the methods disclosed herein, provide for contextual awareness that allow changes in system context to trigger execution of one or more processes in accordance with certain policy rules. DEN-ng further allows for single information model to account for diverse information that may needed to manage a complex system requiring cross-expertise spanning a multitude of diverse fields. To this end, information models, such as DEN-ng, provide a common framework to support varying, underlying data models. DEN-ng models define are cable of defining a set of classes and subclasses that allow instantiation of objects and generation of object instances with sub-class data using one or more patterns as described herein. Although DEN-ng defines a layered information model approach, one skilled in the art would readily recognize that the embodiments as described herein are not limited to a layered information model, but rather may be implemented by other information models providing a sufficient definition of classes and relations such to enable instantiation of required subclasses into various data models and further in accordance with applicable business or policy rules.

In addition to the functionality provided by information models such as DEN-ng, systems implementing the methods described herein support additional context-awareness across not only diverse object types, but also diverse object behavior. Through the provision of various policy or business rules, systems implementing the methods as described herein allow for design of contextually aware systems that have a unique degree of scalability and recyclability. Policy rules interact with the dynamic object-oriented information model, and hence, the set of dynamic object-oriented data models produced from the dynamic object-oriented information model, using pre-defined control points, typically at the data model level. The set of policy rules enable additional behavior to be performed before or after an object is invoked and instantiated from the data models via the data model control points. Policy rules thus allow for more complex types of behavior to be dynamically modified and added at runtime, either through patterns (e.g., the strategy pattern) or through executing one or more policy rules.

For example, metadata may be both attached to policy rules, but also change the content and structure of the policy rule itself. This is because metadata can specify the use, at runtime, of object stitching, which can be used to change the various components comprising a policy rule. Furthermore, the use of object stitching may enable the structure and/or behavior of the policy rule to be dynamically changed, at runtime, without changing code or data in supporting repositories.

Information models as described above can act as planning mechanisms for system objects. Just as objects can be arranged in a hierarchy by an information model, policy rules can also be arranged in a hierarchy. In this scenario, policy rules whose actions are lower in the hierarchy can be grouped together to form conditions for policy rules that are higher in the hierarchy. In this way, the results of lower-level policy rules can be used as a "micro-level adjustment" for higher-level policy rules. In addition, the higher-level, "macro-level adjustment" policy rules can be of mixed types (e.g., event-condition-action ("ECA"), goal, and utility functions) as well as of mixed implementation languages.

For example, the actions of a policy rule can be used to dynamically control the instantiation of new objects, as well as to determine when to use a current object instance instead of instantiating additional model elements. Specifically, policy rules are used to control which types of instances are used in order to represent and control the underlying behavior of objects depending on the type of the object or managed entity, and the context of the object and/or managed entity's use. Thus, resources and objects may be of diverse types and be used by a system in a diverse set of contexts, but policy rules may dynamically respond to these factors to control and optimize the instantiation of subclasses in order to properly execute modifications to a system resource or to a managed entity dynamically at runtime and without changing any underlying code. As one skilled in the art would recognize, the particular use of policy rules is necessarily dependent on the type of the system involved and desired nature of the system management. Methods as disclosed herein allow for scalability and adaptability by allowing policy rules to account for and implement a broad range of complex behaviors. Moreover, complex policy rules can be combined into a higher-level strategy approach wherein lower-lever policy rules can be used as preconditions for the execution of higher-policies, further facilitating adaptability and scalability of the various embodiments.

Figure 8:
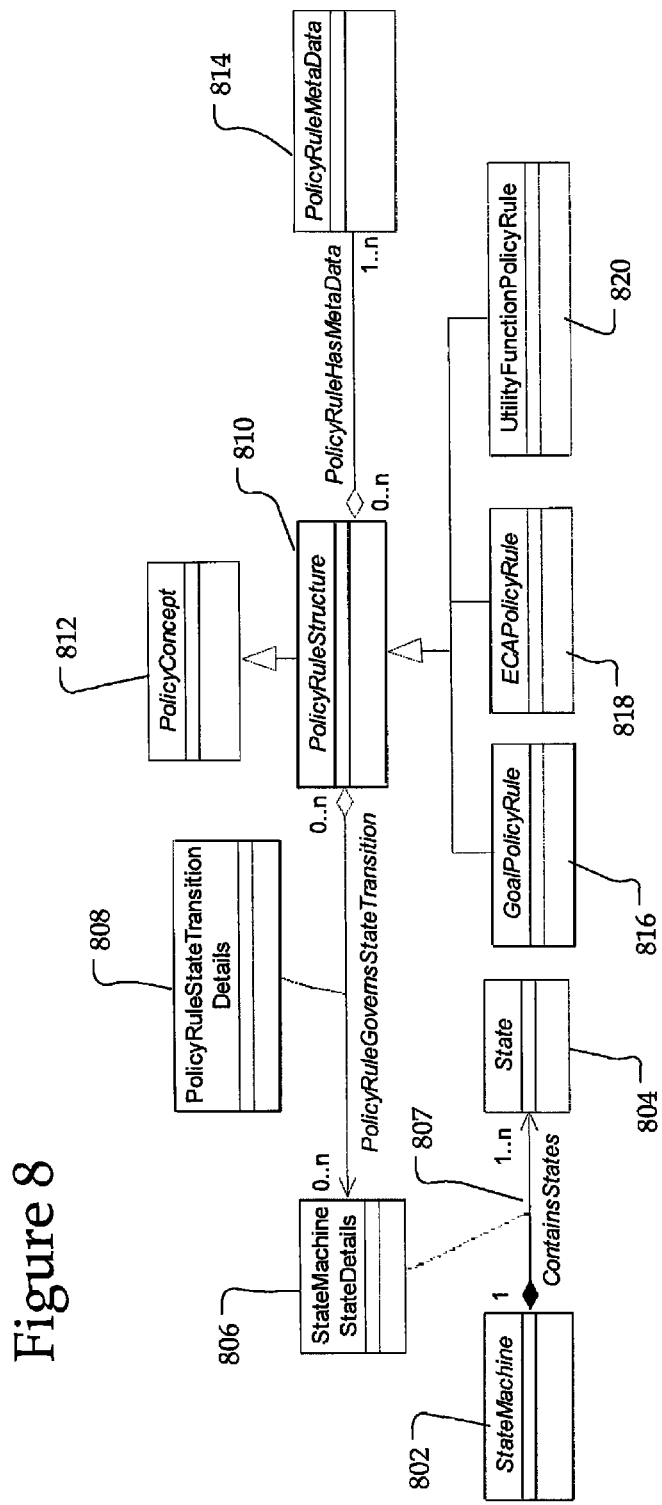
FIG. 8 is a class diagram of an exemplary definition of a set of classes for specifying, defining, and applying use of policy rules to control state transitions in accordance certain embodiments.

Referring now to FIG. 8, a diagram of an exemplary use of policy rules to control state transitions is shown. A StateMachine 802 is defined. In DEN-ng, for example, a StateMachine is an abstract superclass that models different types of behavior that can be represented by different types of State Machines. A State Machine is made up of a set of states, state transitions, and actions. This class is the parent of different subclasses, such as ExtendedFiniteStateMachine.

A State 804 is defined as a unique collection of information, valid during a particular time period during the life of an object, during which one or more of the following apply: (1) one or more of its attributes each has a range of values that are unique to this particular state; (2) all required relationships meet the following conditions that are unique to this particular state: a) owned containment attributes contain (or not) references to created (or destroyed) relationships, and b) in the case of relationships that are realized by association classes, any communication required between classes used to implement the relationship and the classes that the relationship connects has been completed; (3) the object can perform one or more internal actions that are used to either maintain its current state or to transition to a new state. Internal actions are not visible outside of the object, and hence other objects and states do NOT depend on internal actions performed; (4) the object can perform one or more external services (in contrast to internal activities, external services are visible to other objects and states, and hence represent dependencies and control points that may have far-reaching effects); (4) the object waits for an external event to trigger a new action. The ContainsState 807 composition ensures that for every StateMachine 802, at least one State 804 is provided, and that if a State is instantiated, it can only belong to one StateMachine. Furthermore, since this is a composition, any operation applied to the composite (StateMachine 802) is also applied to all constituent components (i.e., States). The ContainsState 807 composition has special semantics that are realized by the StateMachineStateDetails 806 association class. This enables a class, with its attributes, methods, and relationships, to realize the semantics of the composition.

PolicyRuleGovernsStateTransition 808 defines the set of PolicyRules 810 that are used to govern the behavior of States 804 in a StateMachine 802 using the StateMachineStateDetails 806 association class. This is a complex aggregation, and may need to change according to context. Thus, it is realized as an association class PolicyRuleStateTransitionDetails 809. This aggregation defines the set of PolicyRules that govern this particular StateTransition for this particular StateMachine. PolicyRuleStructure 810 defines an abstract superclass that defines common characteristics and behavior for different types of PolicyRules (e.g., Event-Condition-Action, Goal, and Utility Function Policies, which are defined as subclasses in blocks 816, 818, and 820 respectively). PolicyRuleStructure 810 aggregates its own specific type of metadata using the PolicyRuleHasMetaData aggregation 813, which defines which set of PolicyRuleMetaData 814, which enables specific subclasses of the MetaData class to be defined that are appropriate for capturing the metadata concerning different types of policy rules (i.e., their version, when they can be applied, the execution order of their actions, and the like). The above illustration is a simplified model of an exemplary DEN-ng implementation and should not be construed as limiting the principles disclosed herein.

In summary, different types of PolicyRules can control when a StateTransition is allowed to occur. The StateTransition represents the transition from one 804 State in a StateMachine 802 to a different State 804. The use of these two association classes enables attributes and behavior specific to the StateTransition, as well as between which source and target states, to be captured in an extensible way. In addition, the PolicyPattern can be applied to each association class; this enables changes in context to trigger the use of new PolicyRules; the actions of the new PolicyRules can then be used to alter the semantics of the StateTransition. For example, different States may have different attributes associated with them, such as their weight and alphabet used. This structure enables any type of policy rule to dynamically change how a StateMachine composites its States, and define what conditions must be met for a State to transition to another State.

Information models implemented using DEN-ng approaches and/or state transitions may be further extended to support multiple types of policy rules. The embodiments support ECA (event-condition-action) strategies, as well as derivative forms of ECA, such as condition-action (which are desirable for expert systems), goal policies, and utility functions, each of which may be suitable to particular system applications. For example, an ECA policy specifies an action to move from state 1 to state 2; a goal policy specifies a desired set of states, any of which is acceptable, given some criteria; a utility function assigns a value to each resulting state and tries to maximize the "best" result. More importantly, current embodiments extending the DEN-ng model abstracts each of these concepts such that the system designer can provide policy rules that dynamically mix and match these policies and implementation technologies (such as Drools, Java, and/or JavaScript) in order to optimize management of system resources.

Additional embodiments further extend the information model and context-aware policies described herein in order to provide the dynamic capabilities as a series of context-aware patterns. In these embodiments, context-aware policies rules may be made part of the design in a repeatable and scalable manner. In addition, embodiments provide the ability to enable different policy rules to work with each other; for example, this enables an event to initiate changes to be applied to multiple devices in multiple administrative containers. Further embodiments may define multiple types of metadata for each type of policy rule used.

Figure 9:
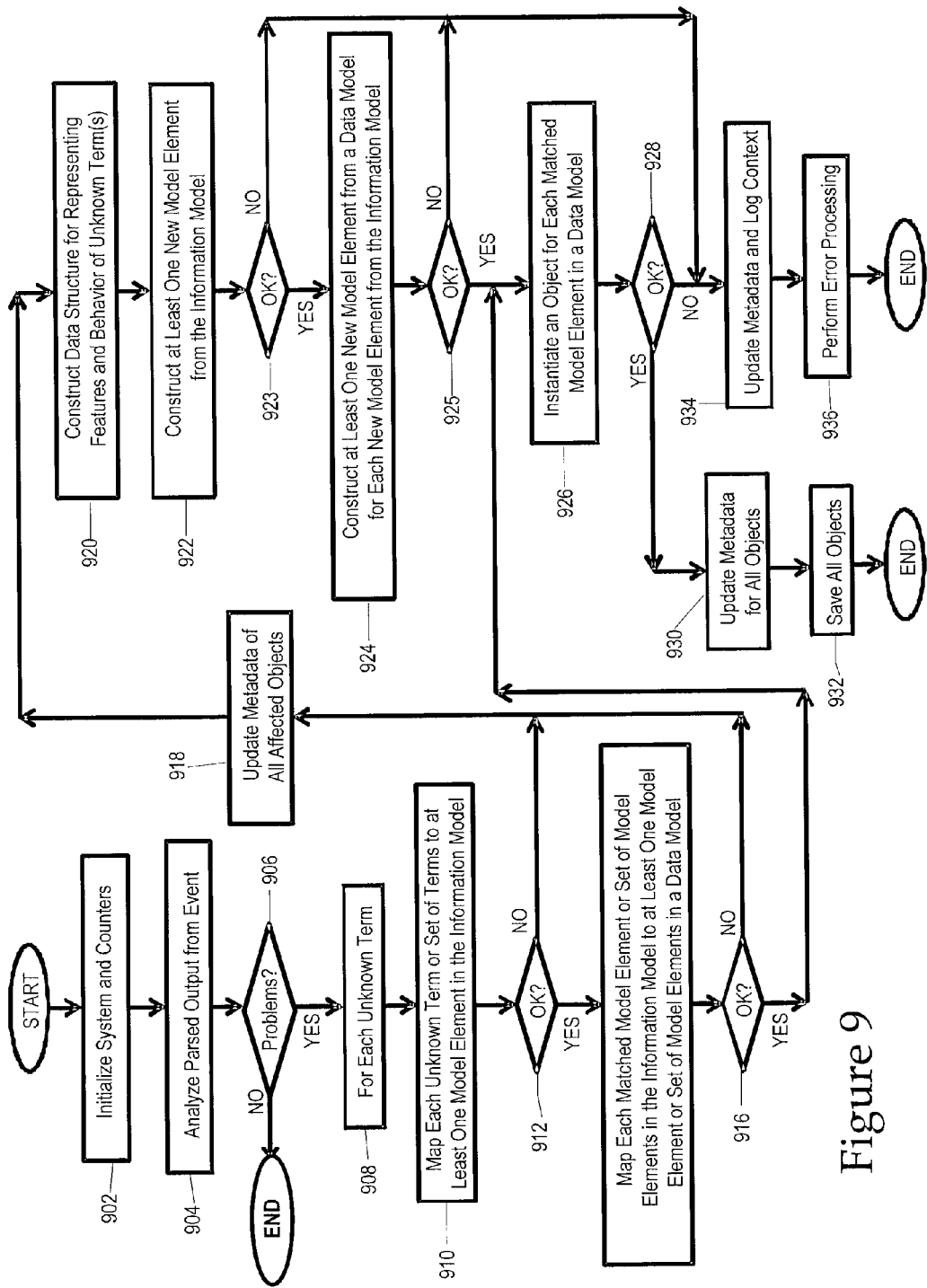
FIG. 9 is an exemplary flow diagram of operations directed by the management device responding to unknown, missing, incorrect, or ambiguous terms encountered in the query or trigger by using knowledge from the information model to resolve inconsistencies in accordance with certain embodiments.

Referring now to FIG. 9, which illustrates an exemplary operational flow diagram that uses the information model to resolve problems encountered in the parsing of events and/or triggers. In FIGS. 5 and 7, it may be assumed that the event and/or trigger contained instructions to the management device that defined the operations that the management device was supposed to perform. Additionally, using an information model, and data models derived from an information model as described herein, it is possible for the management entity to correctly interpret the instructions contained in the event and/or trigger, even though said instructions contain errors, missing data, incorrect data, and the like. An exemplary set of methods for detecting and correcting these and similar problems are illustrated in FIG. 9.

In some embodiments, resolving problems with parsing an event or trigger may be done using the knowledge present in the information and data models. In such embodiments, the management system 310 first initializes appropriate processing logic in block 902. In block 904, the parse tree from parsing the event or trigger is analyzed to identify the set of terms, commands, and other data that is either ambiguous, not present in the current set of data models being used, or which presents other problems that prevent the management system 310 from responding to the event or trigger. If no problems are identified, then this method finishes. Otherwise, in block 908, the management system creates a loop to process each unknown element in the parse tree of the event or trigger that contains an "unknown" term (i.e., a term causing a problem within the system). The processing starts by mapping each unknown term to at least one model element in the information model. If the management system 310 receives, for example, a portion (but not all) of a command via dedicated interface 351 from a remote entity (e.g., an EMS or NMS), then the management system 351 may not understand how to process or respond to the command. This may be the result of loss of data in the communication between the remote entity and the management system 310. Accordingly, in block 910, if the management system 310 is not able to understand a received event or trigger, management system 310 tries to identify the command (or data) by mapping the portion of the received command (or data) to an object that is known or stored within the information and/or data models.

If the unknown term can be mapped to a model element in the information model, then the management system 310 has successfully recognized the unknown term by matching it to a model element. In this scenario, processing proceeds from block 912 to mapping the matched model element in the information model to at least one model element in a data model in block 914. This reifies the abstract set of concepts contained in the information model to a physical form. At block 916, if this mapping has succeeded (i.e., the management system 310 has been able to create one or more model elements in a data model that can be instantiated and used to respond to the query or event), then execution continues to block 926, where an object is instantiated for each matched model element in the data model. If the instantiation is executed without any problems at block 928, then the metadata for all objects are updated and saved at blocks 930 and 932, respectively. This method then completes, and the management system 310 may then continue with responding to the received event or trigger.

If the object instantiation in block 926 was not successful, then the context of the system is collected and the metadata is updated and saved in block 934. Error processing is then initiated in block 936. The result of the error processing will determine if this is a fatal error. For example, the management system 310 may be either not able to (1) execute one or more commands received, and/or (2) understand one or more data items that were received as part of the event or trigger. If this is a non-fatal error, then the management system 310 may try to continue to either execute the one or more received commands that it was not able to before, or will try again to parse the commands and/or data received.

If the result of either block 912 (i.e., if the unknown term could be mapped to at least one model element in the information model) or block 916 (i.e., if the model element in the information model could be mapped to at least one model element in at least one data model) is no, then execution continues to block 918, where the metadata is updated for all affected objects. At block 920, one or more types of specialized data structures are created to facilitate querying the information model to see if any similarly named elements exist. A preferred implementation will typically use either a Deterministic Acyclic Finite State Automaton (DAFSA) or a Trie in order to better represent the characteristics and behavior of the set of unknown terms. A DAFSA is a data structure that represents a set of strings in such a way as to enable querying the members of the data structure to see if an input string belongs to the DAFSA in a time proportional to its length. It is similar to a trie, but a DAFSA is typically more space efficient. In alternative embodiments, a Trie can be used, because despite efficiency concerns, it may be capable of more easily embedding additional information, such as metadata, that can be used to describe additional information about the string. For example, instead of simply having a string labeled "edge router," a Trie could very easily associate additional text or metadata with the string, which could then be used to more easily determine if the string representing an object (or describing or defining data) is the actual string desired or not.

Regardless of data structure, in block 922, the management system 310 attempts to create at least one new model element in the information model to represent the unknown term. The results of this operation are checked in block 923. If successful, then execution continues to block 924, which then creates at least one corresponding model element in at least one data model. The results of this operation are checked in block 925. If this is successful, then execution continues to block 926, and operation continues as previously described. If the results of either block 923 or 925 are not successful, then in both cases, execution proceeds at block 934, and operation continues as previously described.

Figure 10A:
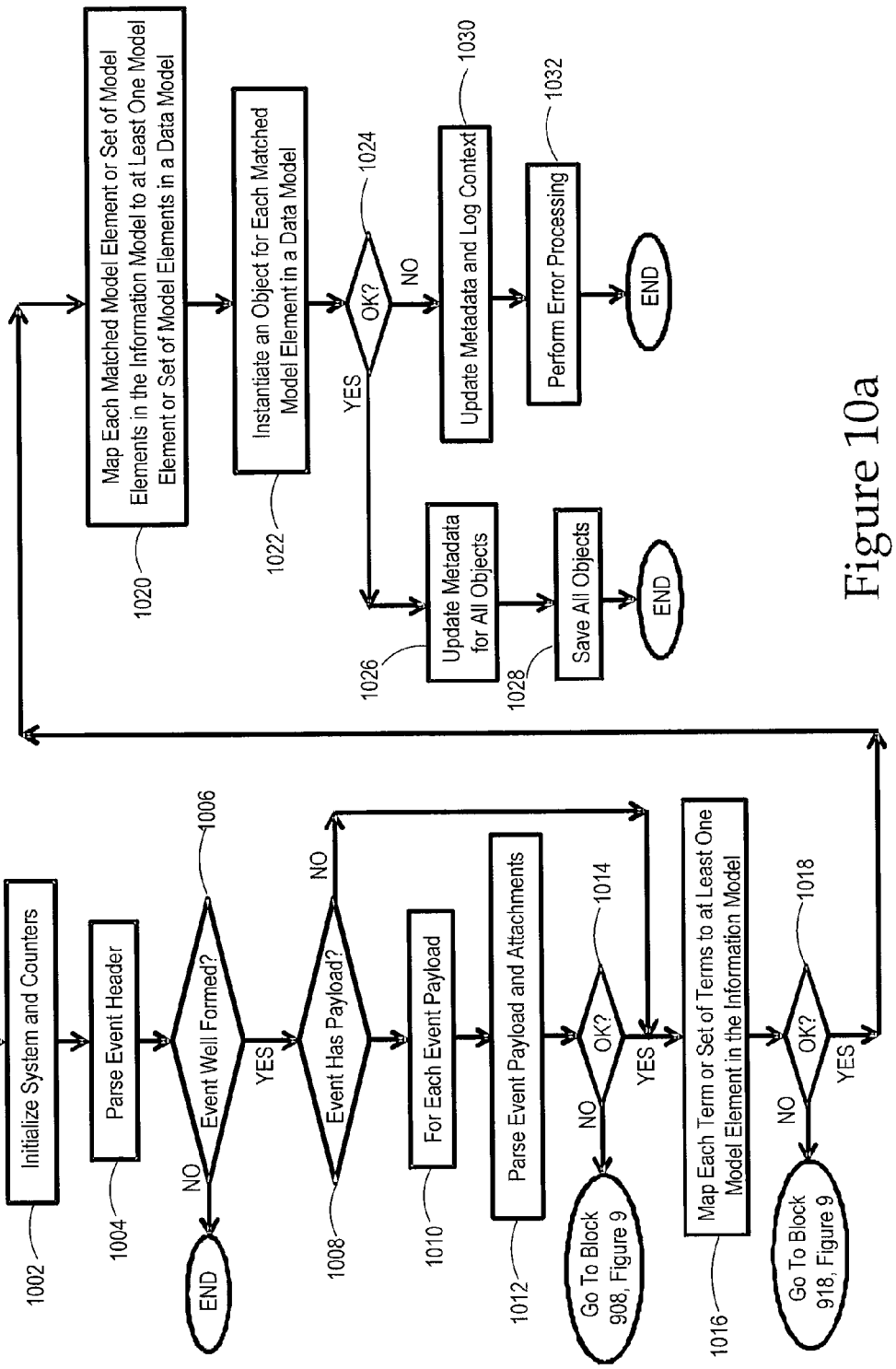
FIG. 10a is an exemplary flow diagram of operations directed by the management device to initialize the management system to be able to respond to an event and/or triggers in accordance with certain embodiments.

Referring now to FIG. 10a, which illustrates an exemplary operational flow diagram that initializes the management system and the management device to respond to events and/or triggers, in accordance with various embodiments. The management system 310 first initializes appropriate processing logic in block 1002. In block 1004, the management system 310 parses the header of the received event or trigger. In block 1006, the management system 310 determines if the event header is well formed (i.e., if the event or trigger contains valid commands and/or data). If it is not, then processing proceeds to block 1030, where the context of the system is collected and the metadata is updated and saved in block 1030. Error processing is then initiated in block 1032. The result of the error processing will determine what further actions the management entity 310 will take. For example, with certain fatal errors (e.g., if this event or trigger is malformed and cannot be acted upon), the management system 310 may elect to send the remote system an error event describing the problem. After that, processing will stop and this method exits. With non-fatal errors, then the management system may elect to operate on the portions of the event or trigger that it understood.

If the management system 310 determines (in block 1006) that the event is well-formed, then in block 1008 it checks to see if the event has an associated payload, for example, by checking an event's header. If the event or trigger does have a payload, then the management system sets up a loop to iterate through each separate payload in the event or trigger in block 1010. Each payload is parsed in block 1012. If the parsing of a particular payload does not succeed, then at block 1014 execution continues at block 908 in FIG. 9. Otherwise, the payload is parsed and its parse tree is added to the parse tree of the event, or the system determines that no payload is present. In any event, execution continues at block 1016.

At block 1016, the management system 310 has a complete parse tree, representing the received event or trigger; this includes any additional data, in the form of one or more payloads. The management system 310 then attempts to map each term (or set of terms) to at least one model element in the information model. If, in block 1018, the management system 310 determines that this operation is not successful, execution continues at block 918 of FIG. 9. Otherwise, execution continues to block 1020, In block 1020, each matched model element in the information model is mapped to at least one corresponding model element in at least one data model. The results are verified in block 1021. If unsuccessful, execution continues at block 918 of FIG. 9. Otherwise, execution continues to block 1022, where an object is instantiated for each matched model element of a data model. Results are again verified in block 1024. If successful, then the metadata for all objects are updated and saved in blocks 1026 and 1028, respectively, and the method terminates. Otherwise, execution continues at block 1030, where the system context is logged, and the metadata is updated and saved. Error processing is then performed at block 1032 as previously described.

Processing of an exemplary event continues in FIG. 10*b*. FIG. 10*a* does the necessary initialization, while FIG. 10*b* uses the various components in the management system to respond to the event and/or trigger. In certain embodiments, a number of commands, in the form of context-aware policy rules, may have been sent by a remote entity through the dedicated management interface 351 to the management system 310. It is assumed that all policy rule commands have been correctly parsed.

In block 1040 of FIG. 10, a data structure that is optimized for querying the context of all parsed context-aware policy rules (such as a DAFSA or a Trie) is created. Using this data structure, the semantics of all of the context-aware policy rules are analyzed and ordered by dependency, thereby providing safe and optimal execution of the policy rules. This results in ordering the policy rules into a graphical structure, from which, in block 1044, the optimal execution path (or paths) may be found using any desired algorithm, such as Djikstra's least cost algorithm.

The optimal path defines the order of execution of the received policy rules. Each policy rule may be viewed as changing the configuration and/or gathering operational, administrative, management, and/or performance data, of a set of manageable entities. The set of policy rules are executed in block 1046 according to the optimal path. As each policy rule executes, its operation is monitored in block 1048. If no problems are encountered, then in block 1050, changes are made to all affected objects, their associated metadata are updated, and all changes are saved. Execution then continues to block 1052, which checks to see if additional policy rules are waiting to be executed. If so, then operation returns to block 1046; otherwise, this method terminates.

If one or more problems are detected in the execution of a policy rule, then in block 1054, the execution context of that policy rule and all appropriate metadata are updated and saved. Then, in block 1056, error processing is initiated in order to determine the severity of the error. If the error is not fatal, then processing may be able to continue to block 1052 as previously discussed. Otherwise, the method terminates and the management system may take additional action as appropriate.

Figure 11:
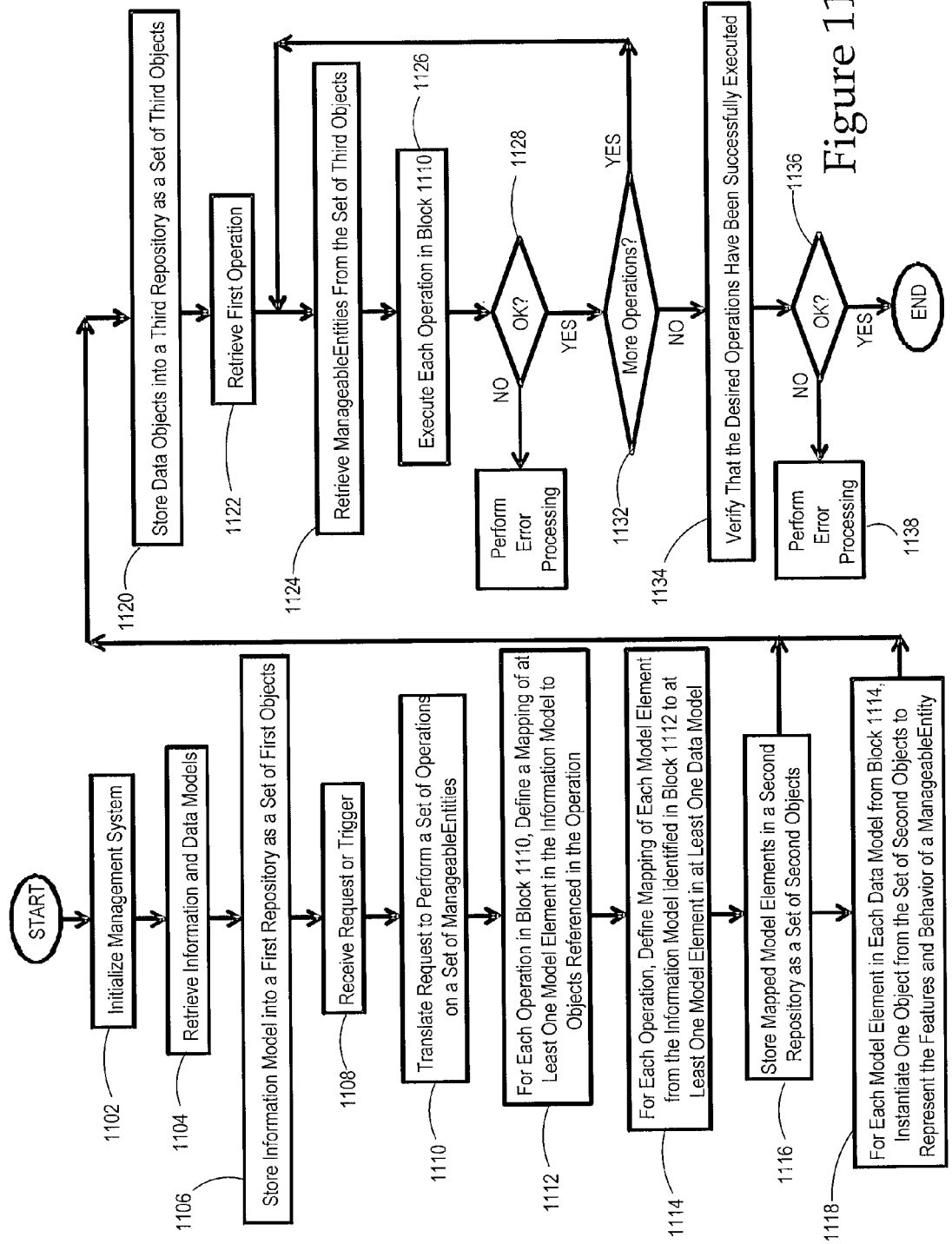
FIG. 11 is an exemplary flow diagram of operations directed by the management device for specifying and managing the features and/or behavior of a set of managed entities in response to an event and/or trigger, in accordance with certain embodiments.

Referring now to FIG. 11, which illustrates an exemplary operational flow diagram for specifying and managing the features and behavior of a set of managed entities through the exchange of events and/or triggers, in accordance with various embodiments. In block 1102, the system is initialized. The information model, along with all applicable data models, is retrieved in block 1104. The set of objects contained therein are stored into a repository in block 1106. The management system 310 then waits until an event or trigger is received. In some embodiments, the set of operations may include a set of commands to execute and/or a set of data to process. In addition, the set of operations may specify, as part of the event or trigger, a set of manageable entities upon which to operate. Hence, the remainder of this method will: (1) parse the event or trigger to determine what set of actions to perform, (2) identify any objects that are referenced in the event or trigger and map them to an equivalent set of manageable entities, (3) perform the requested set of operations, and (4) verify that the requested set of operations was successfully completed.

Accordingly, when an event or trigger is received in block 1108, it is parsed by the management system 310 in block 1110 to determine the set of operations to perform, to convert any references to objects into manageable entities, and to identify any data that was sent. In block 1112, for each command that was identified in block 1110, a mapping function is derived that identifies one or more model elements of the information model for each object in each command identified in block 1110. Then, for each identified model element in the information model, a second mapping is defined to map said model element to at least one corresponding model element in at least one data model. This enables any objects that were explicitly referenced and/or implicitly inferred by the set of Operations received in the event and/or trigger to be understood (i.e., have their syntax and semantics mapped to manageable entities in the management system 310) and put in a concrete form in one or more data models.

Execution now continues to block 1116, where the set of model elements that have been mapped from the information model to the at least one data model is stored in a second repository. In alternative embodiments, the information model, all data models, and all changes to each, may be stored in a single repository, in separate repositories, or in any combination thereof.

In block 1118, the management system 310 will, for each command, see if any model elements from any data model are identified. If so, then the management system 310 will instantiate one object that corresponds to each separate model element. In one embodiment, in block 1120, the management system 310 will store all such instantiated objects in a third repository.

In block 1122, the management system 310 retrieves the first requested operation. In block 1124, the management system 310 retrieves any manageable entities that were identified in the requested set of operations. In block 1126, the management system 310 then executes the requested operation. In block 1128, the management system 310 checks to ensure that this operation executed correctly. If it did not, then in block 1130, error processing is performed. The result of this error processing will determine whether the method should retry the operation, or continue processing any remaining operations in the request, or exit.

If, in block 1128, no errors were detected, then in block 1132, the management system 310 checks to see if any additional operations from the original event or trigger are waiting to be executed. If so, then processing returns to block 1124 and execution continues as previously described. Otherwise, execution proceeds to block 1134, where the management system 310 verifies that the operation has been correctly performed. If, in block 1134, the verification is unsuccessful, then additional error processing may be performed by the management system 310 to determine what should be done. Otherwise, the method terminates.

Figure 12:
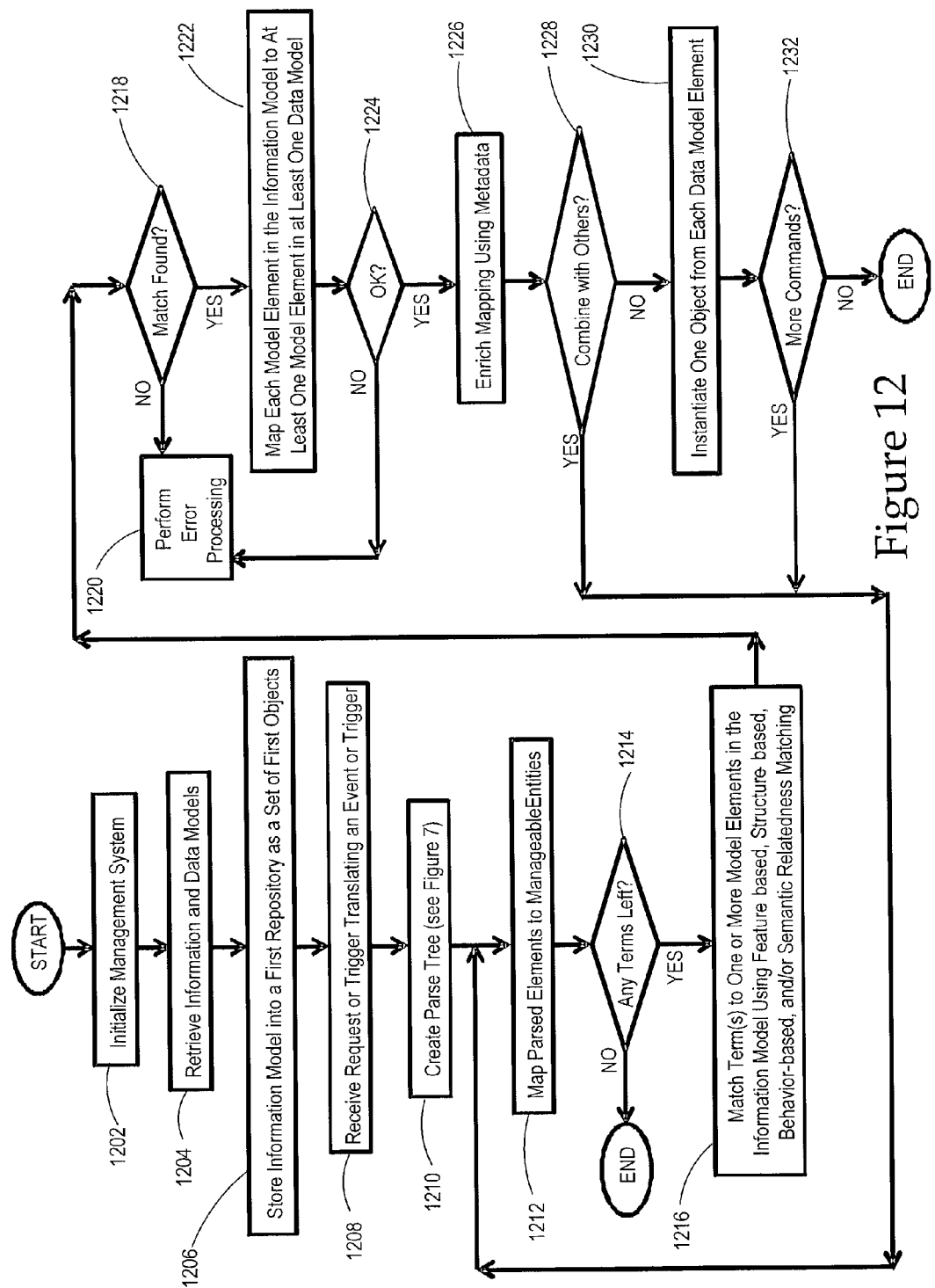
FIG. 12 is an exemplary flow diagram of operations directed by the management device for translating a request from a system or network entity to operate on a set of managed entities in accordance with certain embodiments.

Referring now to FIG. 12, which illustrates an example operational flow diagram for translating or mapping a request from a system or network entity to perform a set of operations on a set of manageable entities. Examples of operations include monitoring the state of the manageable entities by, for example, retrieving the values of a set of counters at pre-defined intervals, changing the configuration of a device to add or remove services, and determining if a device had an alarm, and the severity of said alarm. In some embodiments, the mapping may identify manageable entities as well as policy rules within the system. At block 1202, the method is initialized and the information model, along with all applicable data models, is retrieved in block 1204. In one embodiment, the set of objects are stored into a first repository in block 1206. The management system 310 then waits until an event or trigger is received in block 1208. In block 1210, the received event or trigger is parsed in a manner similar to that described in FIG. 7, and a parse tree is created. The management system 310 then maps each of the parsed elements to a set of manageable entities. In block 1210, it is assumed that one pass through the parser has been accomplished. At block 1214, it is determined whether the parser has successfully identified all terms and mapped them to a set of manageable entities and whether any terms are left. If no, the method terminates, as the command and/or data have been successfully translated into manageable entities. If terms are left that have not been mapped, then execution proceeds to block 1216, where one or more of several advanced methods for term identification may be performed. If the output of the matching algorithm does not find a match, then for the purposes of this invention, error processing is initiated in block 1220. If there is a fatal error, then the management system 310 will terminate this method and take appropriate action. If there is a non-fatal error, then the management system may try to continue the translation process.

If the matching algorithm locates a match, then in block 1222, each model element from the information model that was matched is combined with the results of the parsing process from block 1210. When completed, each set of model elements from the information model is mapped to a corresponding set of model elements from at least one data model. In block 1224, the management system 310 checks to see if this process was successful. If not, execution proceeds to block 1220, where error processing is initiated as described above. If the process is successful, then each model element from each data model may be enriched with metadata in block 1226. This enables the management system 310 to provide additional information, such as context, to the instantiated objects.

In block 1228, the management system 310 checks to see if there is repetition, duplication, or other effects that can either be optimized and/or corrected. In some embodiments, this may involve combining one or more mappings or the management system 310 making additional inferences based on semantics and policy rules that were unknown to the sender. In such scenarios, execution is returned to block 1212, and processing continues as previously described. If not, then in block 1230, an object is instantiated for each model element from each data model. A final check is performed at block 1232 to ensure that no more commands are remaining. If so, then the method terminates; if commands are remaining, then execution continues at block 1212 as previously described.

Figure 13:
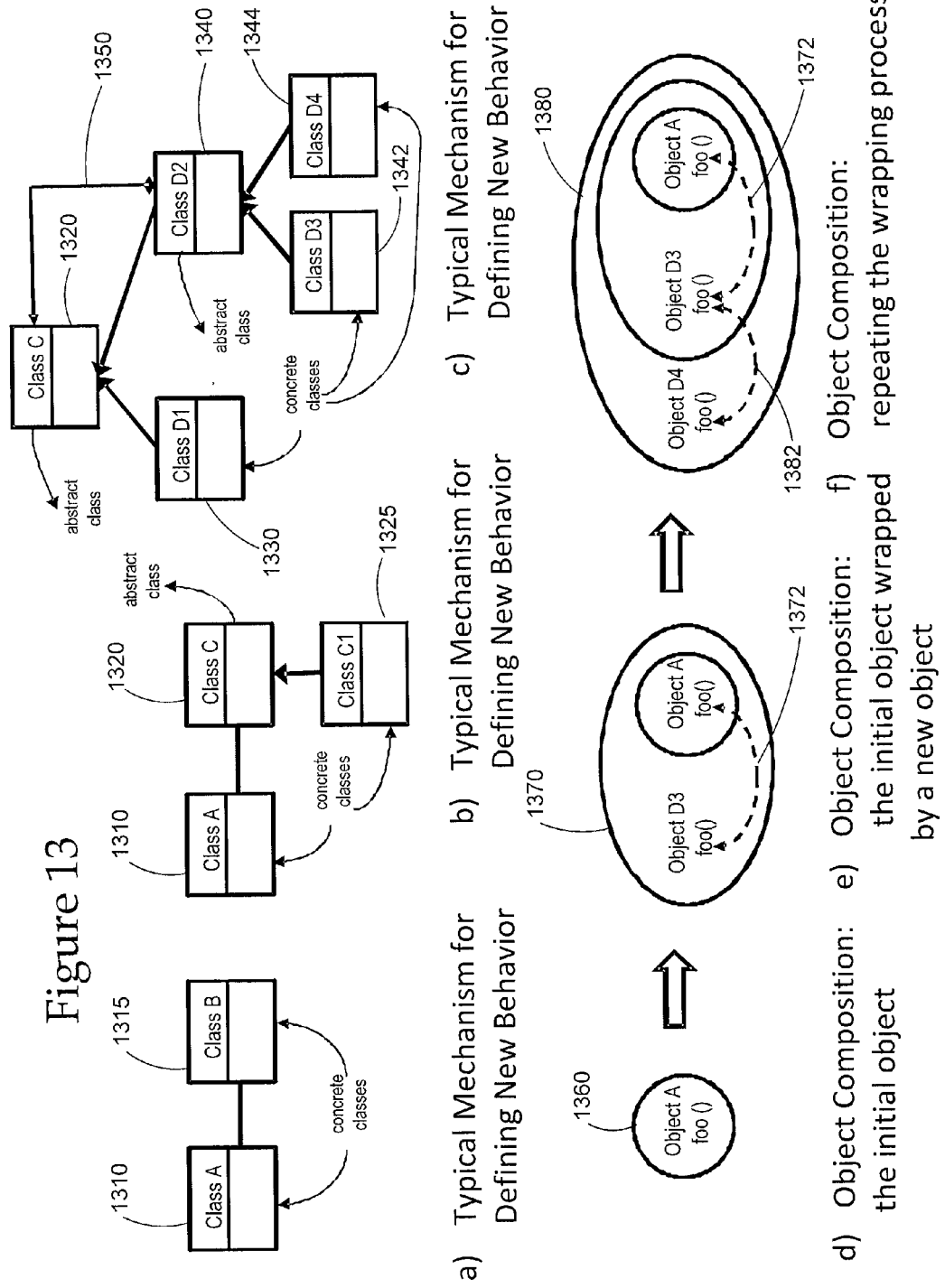
FIG. 13 is a set of diagrams illustrating how object stitching may be used to for changing the configuration of the features and/or behavior of a set of managed entities by using object stitching in accordance with certain embodiments.

Referring now to FIG. 13, which illustrates exemplary differences between traditional mechanisms for defining behavior and using object stitching. Parts a) through c) of FIG. 13 show a traditional way of defining new behavior. Part a) illustrates separate classes having dependency on each other. Part b) illustrates using the Open-Closed Principle to create an abstract class. Part c) illustrates a conceptual diagram of object stitching using an information model as opposed to inheritance. In this example, object stitching enables the developer to write new code for new functionality without altering the existing code, thereby extending the use of the Open-Closed Principle into enabling new responsibilities to be accommodated without making any changes to code of the affected classes.

In the parts c) through f) of FIG. 13, manipulation of object instances is depicted. FIG. 13*c* shows an exemplary pattern for performing object stitching. For example, Class D1 1330 could define a Router Port, while Class D2 1340 could define a Protocol whose subclasses run on the Port of the Router. This enables different Protocols to be instantiated and run to provide different functions on the same Port. Classes D3 1342 and D4 1344 are subclasses of Class D2 1340, and provide extensions of the functionality defined by Class D2 1340. The composition 1350 enables Class D2 1340 to aggregate any number of object instances of Class C 1320, such as subclasses of either class. Similarly, any subclasses of either Class D1 1330 or Class D2 1340 can be contained by an object instance of class D2 1340. Inheritance principles ensure the same types of objects implement the same interface. However, behavior is provided via object composition using the aggregation 1350 and object stitching. This enables behavior to be altered at runtime by compositing objects of type D1 with objects of type D2. Since only object instances are being used, no code is modified.

Referring now to part d) of FIG. 13, Object A 1360 is produced by instantiating class A 1310. In part e) 13e, a new Object D3 1370 is instantiated. Object D3 1370 is the same type of object as Object A 1360, enabling it to be treated the same way as an instance of Object A 1360. Additional, as an object instance, it exists at runtime and therefore, no modification of underlying code is required. Object D3 1370 has an instance variable holding a reference to the object that it is wrapping (in this case, object A 1360). In Figure part f), Object D4 1380 is instantiated and wraps Object D3. When methods a method is called on object D4 1380, it calls the same method on Object D3 1370, as illustrated by line 1382, which in turn calls the same method on Object A 1360, illustrated by line 1372. When the method of Object A 1360 finishes execution, its results are passed back up through the chain. This allows decoupling of the Class A 1310 any functionality that it is requesting as part of an aggregated object.

Figure 14:
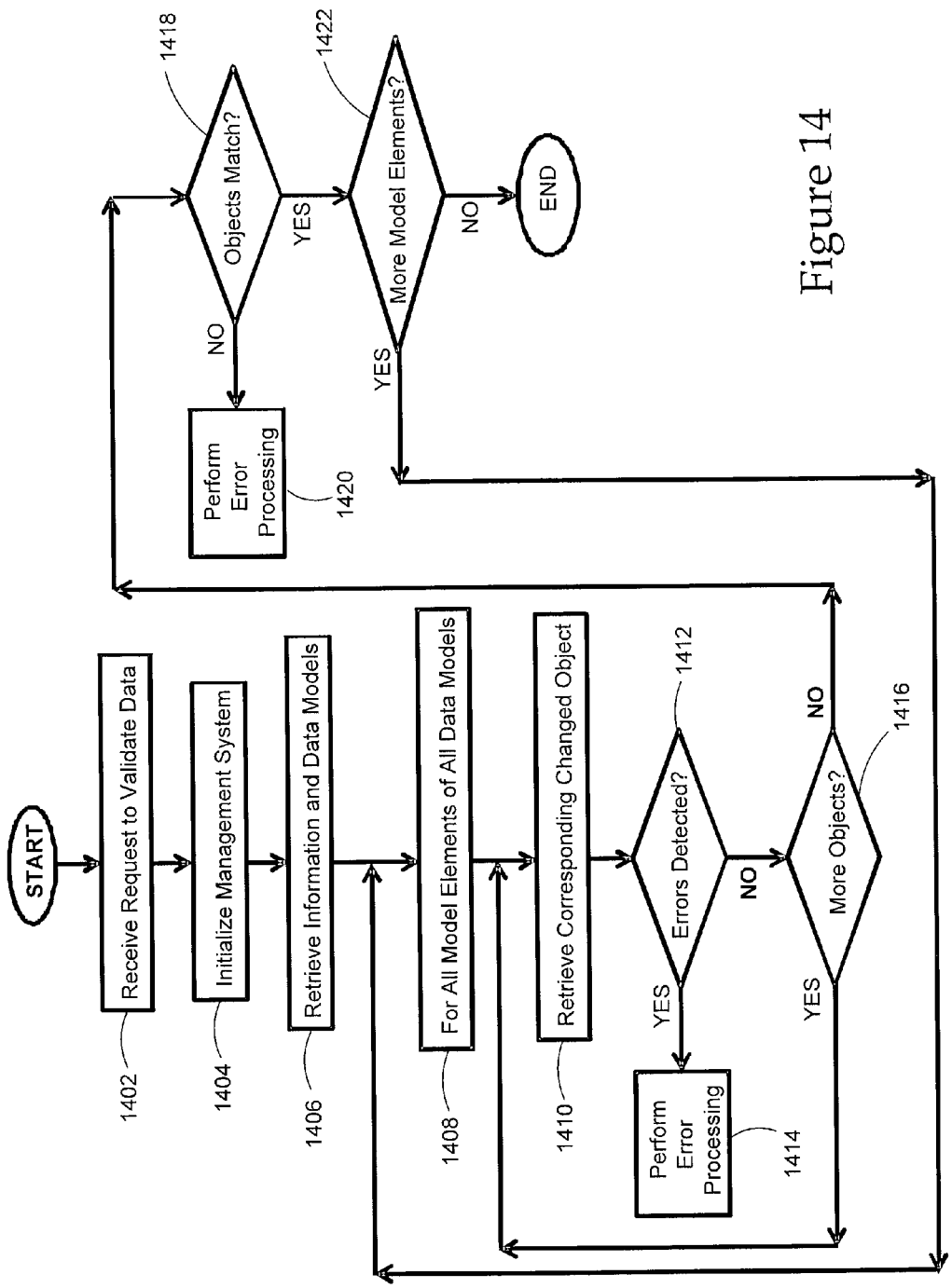
FIG. 14 is an exemplary flow diagram of operations directed by the management device for verifying that the configuration changes performed operate as expected in accordance with certain embodiments.

Referring now to FIG. 14, which illustrates an exemplary operational flow diagram for verifying that the configuration changes operate as expected. When the management system 310 receives a request to validate the configuration changes at block 1402, it initializes the management system at block 1404 and then retrieves the information model and all necessary data models at block 1406. It then sets up a loop to iterate through all affected model elements of each affected data model at block 1408. Within this loop, it retrieves the corresponding set of changed objects from the system being managed 360 at block 1410. The management system 310 then performs a series of tests. At block 1412, error checking is performed to ensure no errors were detected in retrieving the corresponding set of changed objects. If an error was detected, then at block 1414, error processing is initiated as previously described in connection with FIG. 11.

If the result of the check for errors in block 1412 revealed that no errors were found, processing continues to block 1416, where the management system 310 checks to see if additional objects corresponding to other model elements of other data models need to be retrieved in order to verify that the configuration changes were executed correctly. If more objects are needed, control returns to block 1410. Otherwise, control proceeds to block 1418, where a check is performed to verify that the set of objects corresponding to the changed configuration match the set of objects that were used to define the configuration changes. If these objects do not match, then error processing is initiated in block 1420. The result of the error processing will determine if this is a fatal error, such that the validation process must be aborted. If there is a non-fatal error, then the management system 310 may try to continue the validation process.

If the objects do match, then this configuration change has been validated. In block 1422, a check is performed to see if additional model elements from additional data models that define other configuration changes are required to be performed. If so, then execution continues at block 1408. Otherwise, this method terminates.

Figure 15:
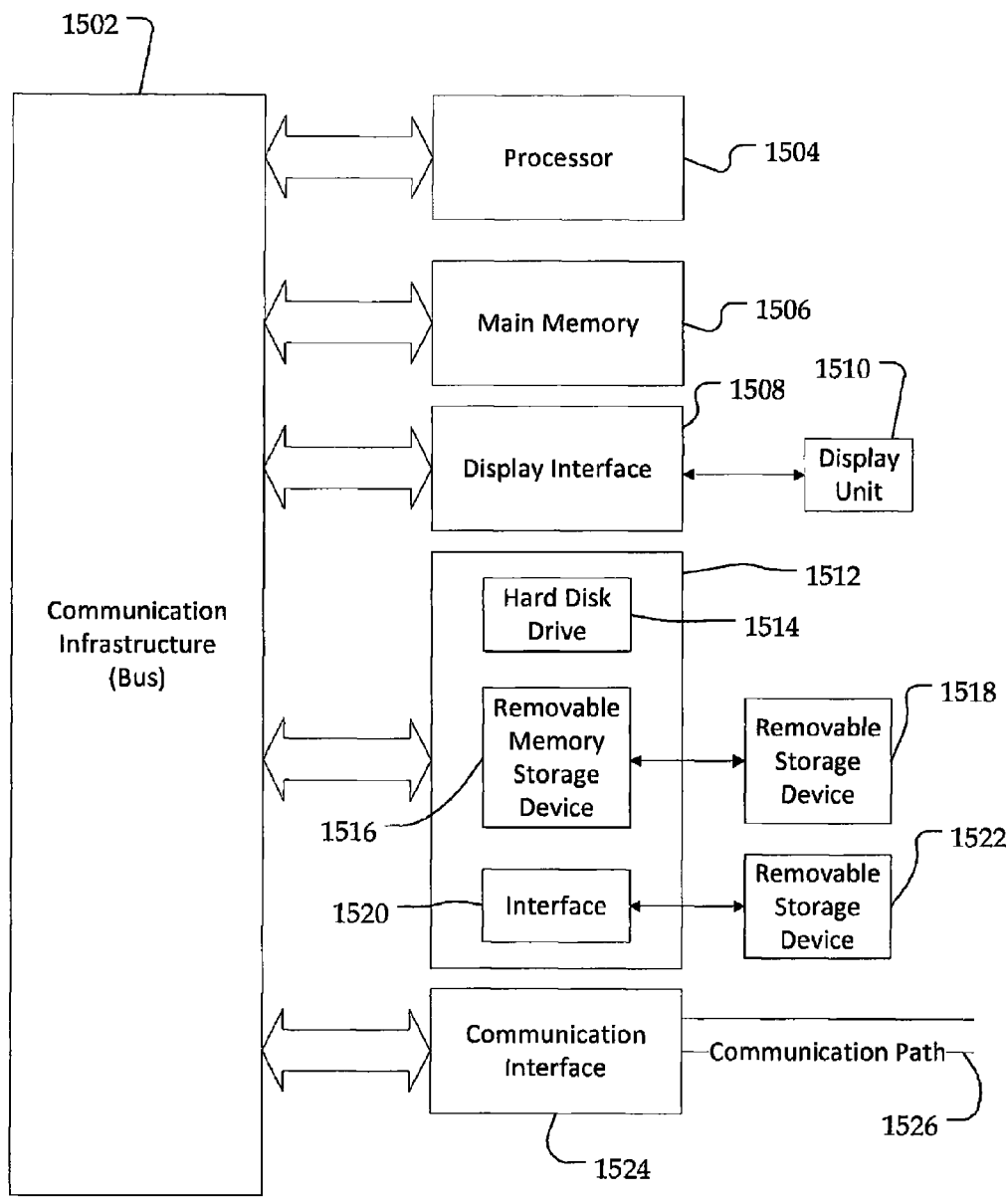
FIG. 15 is a high level block diagram illustrating a more detailed view of a computing system useful for implementing the management device in accordance with certain embodiments.

Referring now to FIG. 15, a high level block diagram illustrating a more detailed view of a computing system 1500 useful for further implementing the management device 400 according to embodiments of the present invention. The computing system 1500 is based upon a suitably configured processing system adapted to implement an exemplary embodiment of the present invention. For example, a personal computer, workstation, or the like, may be used.

In one embodiment, the computing system 1500 includes one or more processors, such as processor 1504. The processor 1504 is connected to a communication infrastructure 1502 (e.g., a communications bus, crossover bar, or network). Various software embodiments are described in terms of this exemplary computer system. After reading this description, it becomes apparent to a person of ordinary skill in the relevant art(s) how to implement the invention using other computer systems and/or computer architectures.

The computing system 1500 can include a display interface 1508 that forwards graphics, text, and other data from the communication infrastructure 1502 (or from a frame buffer) for display on the display unit 1510. The computing system 1500 also includes a main memory 1506, preferably random access memory (RAM), and may also include a secondary memory 1512 as well as various caches and auxiliary memory as are normally found in computer systems. The secondary memory 1512 may include, for example, a hard disk drive 1514 and/or a removable storage drive 1516, representing a floppy disk drive, a magnetic tape drive, an optical disk drive, and the like. The removable storage drive 1516 reads from and/or writes to a removable storage unit 1518 in a manner well known to those having ordinary skill in the art.

Removable storage unit 1518, represents a floppy disk, a compact disc, magnetic tape, optical disk, etc. which is read by and written to by removable storage drive 1516. As are appreciated, the removable storage unit 1518 includes a computer readable medium having stored therein computer software and/or data. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer-readable information.

In alternative embodiments, the secondary memory 1512 may include other similar means for allowing computer programs or other instructions to be loaded into the computing system 1500. Such means may include, for example, a removable storage unit 1522 and an interface 1520. Examples of such may include a program cartridge and cartridge interface (such as that found in video game devices), a removable memory chip (such as an EPROM, or PROM) and associated socket, and other removable storage units 1522 and interfaces 1520 which allow software and data to be transferred from the removable storage unit 1522 to the computing system 1500.

The computing system 1500, in this example, includes a communications interface 1524 that acts as an input and output and allows software and data to be transferred between the computing system 1500 and external devices or access points via a communications path 1526. Examples of communications interface 1524 may include a modem, a network interface (such as an Ethernet card), a communications port, a PCMCIA slot and card, etc. Software and data transferred via communications interface 1524 are in the form of signals which may be, for example, electronic, electromagnetic, optical, or other signals capable of being received by communications interface 1524. The signals are provided to communications interface 1524 via a communications path (i.e., channel) 1526. The channel 1526 carries signals and may be implemented using wire or cable, fiber optics, a phone line, a cellular phone link, an RF link, and/or other communications channels.

In this document, the terms "computer program medium," "computer usable medium," "computer readable medium", "computer readable storage product", and "computer program storage product" are used to generally refer to media such as main memory 1506 and secondary memory 1512, removable storage drive 1516, and a hard disk installed in hard disk drive 1514. The computer program products are means for providing software to the computer system. The computer readable medium allows the computer system to read data, instructions, messages or message packets, and other computer readable information from the computer readable medium.

Computer programs (also called computer control logic) are stored in main memory 1506 and/or secondary memory 1512. Computer programs may also be received via communications interface 1524. Such computer programs, when executed, enable the computer system to perform the features of the various embodiments of the present invention as discussed herein. In particular, the computer programs, when executed, enable the processor 1504 to perform the features of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for specifying the features and behavior of a set of system resources, wherein the method comprises:
   providing a management entity having a processor and a memory;
   providing an information model to represent features, behaviors, or relationships of a set of system resources, wherein said information model includes a first set of model elements;
   deriving, by the management entity, a data model from the information model, wherein the deriving comprises mapping one or more elements of the first set of model elements into a second set of model elements of the data model;
   storing the data model into a first repository;
   deriving, by the management entity, one or more data objects from the data model associated with a behavior, feature, or relationship of a system resource; and
   executing, by the management entity, one or more process to effect one or more system changes specified by the one or more data objects.

2. The method of claim 1, wherein the second repository and first repository are a same repository.

3. The method of claim 1, wherein the system resource is a feature, a relationship to another system resource, a behavior, a service, or configuration of a network device.

4. The method of claim 1, wherein deriving one or more data objects further comprises mapping the one or more data objects onto wrapped object instances at runtime, wherein a new object instance is created and has an instance variable holding a reference to a wrapped object instance that the new object instance is wrapping, and wherein in response to the wrapped object finishing execution of a method, results are passed back to the new object instance.

5. The method of claim 1, wherein the one or more data objects are derived and wrapped by a new object instance based on a set of policy rules defined by the information model.

6. The method of claim 5, wherein the policy rules are executed by metadata associated with the system resource.

7. The method of claim 5, wherein metadata is used to change the structure, content, or behavior of the policy rules.

8. The method of claim 1, wherein the one or more data objects are derived in response to a system event, and wherein at least one new data object instance is created, wrapping a wrapped object instance.

9. The method of claim 8, wherein the system event comprises satisfaction of one or more pre-conditions or post-conditions specified in the information model or data model, and wherein a method call to the new object instance is passed to the wrapped object instance via an instance variable such that the wrapped object instance executes and passes results to the new object instance.

10. A method of configuring a manageable entity, comprising:
    providing an information model stored in a first repository, wherein said information model defines a set of model elements, wherein the model elements specific features, behaviors, or relationships of one or more manageable entities;
    providing a managing device having a processor and a memory, wherein said managing device is in communication with said first repository and is configured to respond to a system event;
    storing to a second repository, a plurality of code sections for deriving a set of one or more data models from the information model, wherein said each data model in said set of data models comprises a subset of said set of model elements;
    wherein said managing device is further configured to respond to said system event by:
    recognizing the system event;
    processing the system event to determine one or more requested configurations for a manageable entity;
    retrieving a plurality of code sections from the one or more data models for managing a requested configuration of said manageable entity;
    constructing one or more objects that represent the requested configuration for the manageable entity; and
    executing one or more processes that implement the requested configurations specified by the one or more objects.

11. The method of claim 10, wherein the information model further defines a set of policy rules to manage device operations.

12. The method of claim 11, wherein the plurality of code sections are executed according to the policy rules defined by the information model.

13. The method of claim 11, wherein the system event further comprises metadata embedded in the system event that may be used to change the structure, content, or behavior of the policy rules.

14. The method of claim 13, wherein changes to the policy rules are used to derive metadata and new policy rules in order to further change the configuration of one or more devices.

15. The method of claim 13, wherein metadata that is missing, incomplete, or incorrect can be detected by the management device and corrected in order to configure the device.

16. A configurable network for specifying the features and behavior of a set of network resources comprising:
   at least one processor coupled to a memory, wherein the memory stores an object-oriented information model, and instruction code executable by the processor to cause that processor to perform at least one transformation process that converts all or part of the information model into all or part of at least one data model wherein the processor:
   modifies instance data of all or part of at least one object created in the object oriented data model based on received network events;
   invokes a mapping function to interpret the modified instance data by mapping the modified instance data to one or more predefined control points in the codes of the one or more data models according to a policy rule; and
   executes the codes of the one or more data models to output network functions to configure a network resource according to the modified instance data, wherein none of the code in the information model changes during the configuration.

17. The device of claim 16, wherein the modified instance data comprises at least one of a modified class, attribute, operation, or relationship instances that have been added, deleted, or altered from the network resource, and wherein a new object instance is created and has an instance variable holding a reference to a wrapped object instance that the new object instance is wrapping, and wherein in response to the wrapped object finishing execution of a method, results are passed back to the new object instance.

18. The device of claim 16, wherein context-aware policy rules may be used to modify the instance data such that a new object instance is created and wraps and instance of at least one of the objects created in the object oriented data model.

19. The device of claim 18, wherein metadata may be used to modify the structure, content, or behavior of the context-aware policy rules.

20. The device of claim 16, wherein the processor is further configured to detect context changes and to perform object wrapping to change the configuration of at least one device without changing code of the device.

* * * * *

UNITED STATES PATENT AND TRADEMARK OFFICE
CERTIFICATE OF CORRECTION

PATENT NO. : 9,460,417 B2  
APPLICATION NO. : 13/916993  
DATED : October 4, 2016  
INVENTOR(S) : John Strassner Page 1 of 1

It is certified that error appears in the above-identified patent and that said Letters Patent is hereby corrected as shown below:

In the Drawings

On sheet 2 of 17, Fig. 2, reference numeral 212m, delete "212m" and insert --$212_m$--, therefor On sheet 2 of 17, Fig. 2, reference numeral 202n, delete "202n" and insert --$202_n$--, therefor On sheet 7 of 17, Fig. 6b, reference numeral 660, delete "660" and insert --630--, therefor In the Specification Column 20, Line 53, delete "620" and insert --640--, therefor Column 21, Line 8-9, delete "EntityMetataDetaDetail" and insert --EntityMetaDataDetail--, therefor Column 31, Line 9, delete "entity" and insert --system--, therefor Signed and Sealed this  
Fifth Day of May, 2020

Andrei Iancu  
*Director of the United States Patent and Trademark Office*